United States Patent
Makhervaks et al.

(10) Patent No.: US 11,372,785 B2
(45) Date of Patent: Jun. 28, 2022

(54) LOCAL NON-VOLATILE MEMORY EXPRESS VIRTUALIZATION DEVICE

(71) Applicant: Microsoft Technology Licensing, LLC, Redmond, WA (US)

(72) Inventors: Vadim Makhervaks, Bellevue, WA (US); Aaron William Ogus, Woodinville, WA (US); Jason David Adrian, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 16/868,285

(22) Filed: May 6, 2020

(65) Prior Publication Data

US 2021/0349841 A1 Nov. 11, 2021

(51) Int. Cl.
  *G06F 13/16* (2006.01)
  *G06F 9/455* (2018.01)
  *G06F 12/02* (2006.01)
  *G06F 13/40* (2006.01)

(52) U.S. Cl.
  CPC ...... *G06F 13/1673* (2013.01); *G06F 9/45558* (2013.01); *G06F 12/0284* (2013.01); *G06F 13/4022* (2013.01); *G06F 2009/45583* (2013.01); *G06F 2213/0026* (2013.01)

(58) Field of Classification Search
  CPC ............. G06F 9/45558; G06F 12/0284; G06F 13/1673; G06F 13/4022; G06F 2009/45583; G06F 2213/0026
  See application file for complete search history.

(56) References Cited

U.S. PATENT DOCUMENTS

| | | | | |
|---|---|---|---|---|
| 11,068,203 B2* | 7/2021 | Maharana | ............. | G06F 3/0626 |
| 2013/0086336 A1* | 4/2013 | Canepa | ................. | G06F 3/0688 |
| | | | | 711/154 |
| 2014/0281106 A1 | 9/2014 | Saghi et al. | | |
| 2015/0254088 A1* | 9/2015 | Chou | ..................... | G06F 3/061 |
| | | | | 709/212 |

(Continued)

FOREIGN PATENT DOCUMENTS

EP 3608792 A1 2/2020

OTHER PUBLICATIONS

"International Search Report and Written Opinion issued in PCT Application No. PCT/US21/020977", dated Jun. 17, 2021, 14 Pages.

*Primary Examiner* — Eric T Oberly

(57) ABSTRACT

A server system is provided that includes one or more compute nodes that include at least one processor and a host memory device. The server system further includes a plurality of solid-state drive (SSD) devices, a local non-volatile memory express virtualization (LNV) device, and a non-transparent (NT) switch for a peripheral component interconnect express (PCIe) bus that interconnects the plurality of SSD devices and the LNV device to the at least one processor of each compute node. The LNV device is configured to virtualize hardware resources of the plurality of SSD devices. The plurality of SSD devices are configured to directly access data buffers of the host memory device. The NT switch is configured to hide the plurality of SSD devices such that the plurality of SSD devices are not visible to the at least one processor of each compute node.

20 Claims, 20 Drawing Sheets

(56) References Cited

U.S. PATENT DOCUMENTS

| | | | |
|---|---|---|---|
| 2015/0319243 A1* | 11/2015 | Hussain | G06F 3/0665 709/217 |
| 2018/0191721 A1* | 7/2018 | Freyensee | H04L 9/0822 |
| 2019/0146684 A1* | 5/2019 | Benisty | G06F 3/0613 711/102 |
| 2020/0042246 A1* | 2/2020 | Maharana | G06F 3/0622 |

\* cited by examiner

LOCAL NON-VOLATILE MEMORY EXPRESS VIRTUALIZATION DEVICE

BACKGROUND

Non-volatile memory express (NVMe) solid-state drives are a useful storage medium. Input/output tasks performed using NVMe drivers typically begin faster, transfer more data, and finish faster than older storage models using older drivers. For example, NVMe solid-state drivers typically perform these input/output tasks faster than older drivers such as Advanced Host Controller Interface (AHCI), a feature of Serial Advanced Technology Attachment (SATA) solid-state drives. NVMe solid-state drives are increasingly becoming an industry standard for servers in datacenters.

SUMMARY

A server system is provided. The server system may comprise one or more compute nodes configured to run host software. Each compute node may include at least one processor and a host memory device. The server system may further comprise a plurality of solid-state drive (SSD) devices, a local non-volatile memory express virtualization (LNV) device, and a non-transparent (NT) switch for a peripheral component interconnect express (PCIe) bus that interconnects the plurality of SSD devices and the LNV device to the at least one processor of each compute node. The LNV device may be configured to virtualize hardware resources of the plurality of SSD devices and present a virtual SSD device to the host software of the one or more compute nodes. The plurality of SSD devices may be configured to directly access data buffers of the host memory device. The NT switch may be configured to hide the plurality of SSD devices such that the plurality of SSD devices are not visible to the at least one processor of each compute node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
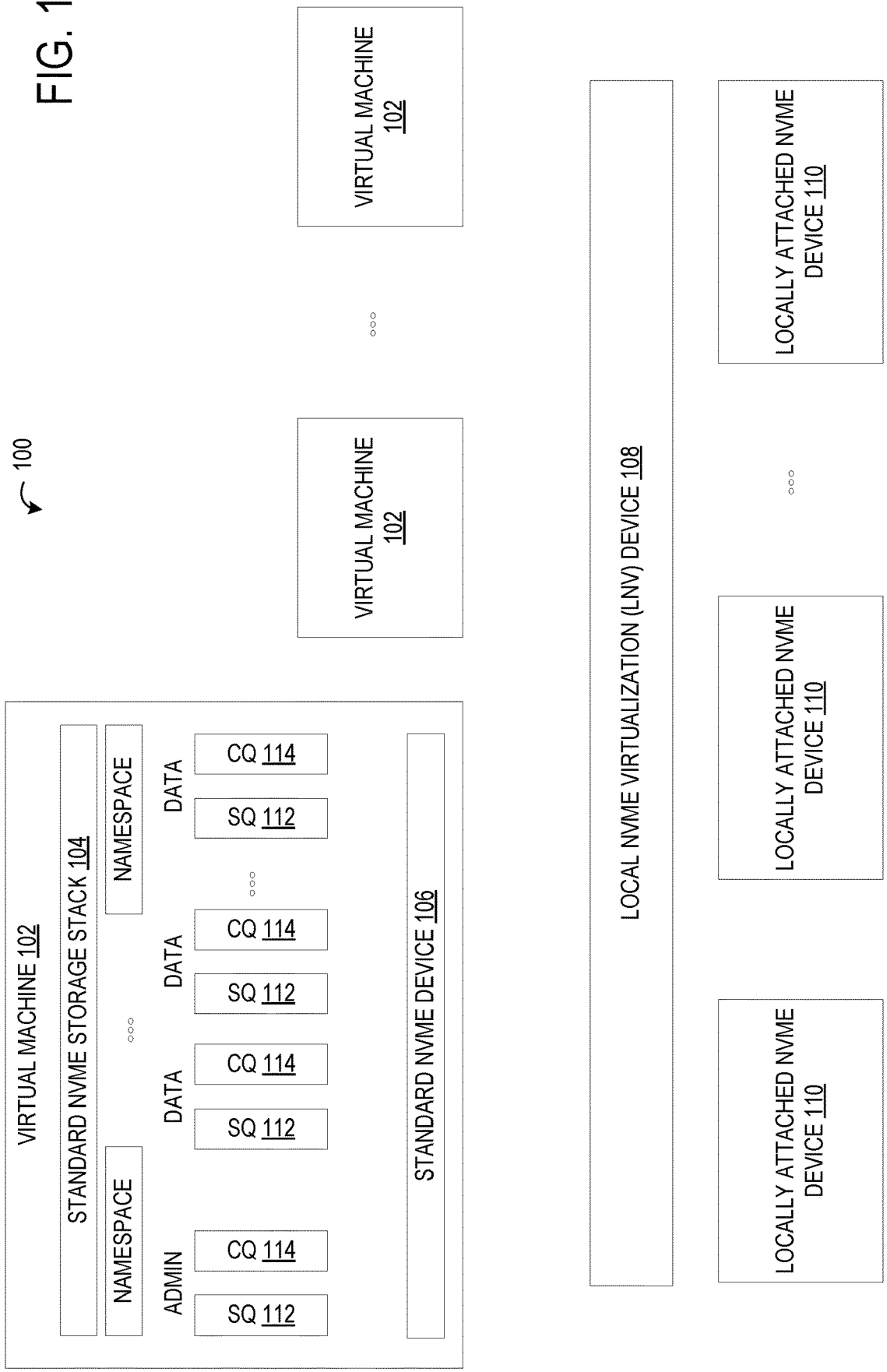
FIG. 1 shows an example system architecture of a server system that implemented solid-state drive virtualization techniques, according to one embodiment of the present disclosure.

FIG. 1 illustrates a system architecture for the SSD virtualization techniques in the context of a server system 100. One or more virtual machines (VM) 102 may be run on the compute nodes of the server system 100, and are exposed to standard non-volatile memory express (NVMe) interfaces such as a standard NVMe storage stack 104. From the perspective of each VM 102, those VMs are communicating with standard NVMe devices 106 using standard NVMe interfaces. However, as illustrated in FIG. 1, a local NVMe virtualization (LNV) device 108 operates logically underneath the VMs 102 and virtualizes one or more locally attached NVMe devices 110 for the VMs 102. That is, there may not be a direct mapping between the standard NVMe device 106 perceived by the VM 102 and the actual physical locally attached NVMe device 110 of the compute node 100. For example, the functions of the standard NVMe device 106 used by a VM 102 may in fact be performed by multiple different locally attached NVMe devices 110 being virtualized by the LNV device 108. As another example, the LNV device 108 may present a portion of a locally attached NVMe device 110 as the entire standard NVMe device 106 used by a VM 102.

These abstraction and virtualization processes are processed and handled by the LNV device 108. Thus, from the perspectives of the VMs 102 and the locally attached NVMe device 110, they are performing standard functions using standard NVMe interfaces. For example, each locally attached NVMe device 110 may be unaware that multiple different VMs 102 and reading/writing data to that locally attached NVMe device 110. The system architecture and LNV device 108 of FIG. 1 provides several potential benefits. Using the LNV device 108 described herein, quality of service, security and performance isolation, and serviceability of the physical NVMe devices may be improved. For example, each solid state drive (SSD) operating as the NVMe devices has a certain number of p-cycles before the SSD device reaches end of life. The LNV device 108 may be configured to manage read/write requests for the locally attached NVMe devices 110 to ensure that a particular NVMe device will not be burned by excessive write requests from a single VM 102. As another example, the LNV device 108 may provide data isolation to improve data security for multiple VMs that are sharing a single NVMe device. That is, the LNV device 108 may prevent a first VM from accessing data stored on a shared NVMe device by a second VM.

As illustrated in FIG. 1, the standard NVMe interface defines a set of submission queues (SQ) 112 and a set of completion queues (CQ) 114. New disk read/write requests for the standard NVMe device 106 may be submitted by the standard NVMe storage stack of a VM 102 to a SQ 112. The standard NVMe device 106, whose functions are performed by the LNV 108 and the virtualized locally attached NVMe devices 110, will perform read the request in the SQ 112, execute the request, and report completion of the request to the CQ 114 to inform the standard NVMe storage stack 104 of the VM 102 that the request has been completed. Using this architecture, NVMe commands (Admin and Data In/Out) from each VM 102 are processed by the LNV 108, which in turn will generate new NVMe commands for the locally attached NVMe devices 110. On the other hand, VM 102 data may be accessed by the LNV and passed to the NVMe device, or directly accessed by the NVMe device to complete the request. In this manner, both the VMs 102 and the locally attached NVMe devices 110 may operate according to standard NVMe interfaces and processes, and virtualization of the locally attached NVMe devices 110 is handled by the LNV device 108.

Figure 2:
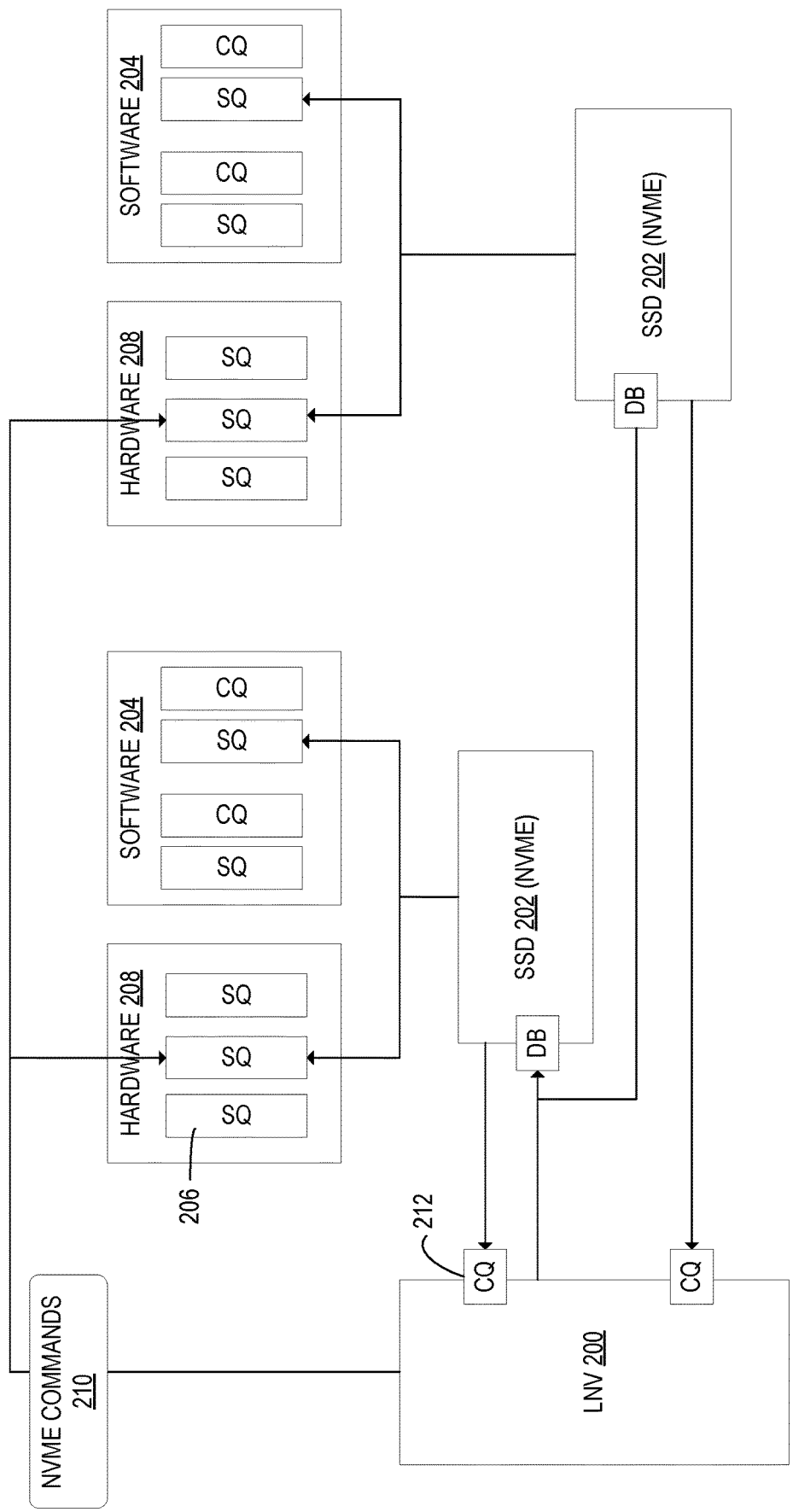
FIG. 2 shows a schematic view of an operation model of peer-direct communication between a local non-volatile memory express virtualization device and a plurality of solid-state drive devices operating using non-volatile memory express interfaces that is implemented by the server system of FIG. 1.

FIG. 2 illustrates an operation model of peer-direct communication between the LNV device 200 and the SSD devices 202 operating using NVMe interfaces. The LNV device 200 is configured to utilize standard NVME interfaces for communication with the local NVMe devices (e.g. SSD devices 202). In one example, the NVMe queues of the local NVMe devices designated for communication with the LNV device 200 may be separate from the NVMe queues designated for communication with the software stack 204 such that the local NVME device may be concurrently used by the software stack 204 and the LNV device 200. Thus, in the configuration of FIG. 2, the NVMe software stack 204 is modified to allocate a subset of NVMe queues of the local NVMe devices (e.g. SSD devices 202) to be controlled by the LNV 200. In the illustrated example, the NVMe submission queues (SQ) 206 allocated to the LNV 200 are shown as the hardware interface 208. The operation model of FIG. 2 does not require software 204 to hardware 208 coordination after the NVMe SQs 206 have been created. The NVMe SQs for the hardware and software interfaces are both located in host memory.

The LNV device 200 is configured to generate NVMe commands 210 and place those commands into the submission queues (SQ) of respective SSDs 202 (e.g. NVMe devices) that are allocated to the LNV device 200 and offloaded onto hardware 208. The NVMe completion queues (CQ) 212 of respective NVMe SSDs 202 that are associated with the SQs allocated to the LNV 200 are mapped to the address space of the LNV device 200. The LNV device 200 may detect NVMe completion queue element (CQE) writes to the CQs by decoding peripheral component interconnect express (PCIe) transactions to the address space for the CQ.

For example, after the LNV device 200 has placed an NVMe command 210 into the SQ of an SSD 202 allocated to the LNV device 200, the LNV 200 may be configured to ring the doorbell (DB) of the associated SSD 202, by writing to a register of the SSD 202. It will be appreciated that PCIe devices, such as the SSD devices 202 and the LNV device 200 described herein, include special registers referred to as "doorbells". Other devices may write to I/O space of a target PCIe device at these special registers to "ring the doorbell" of that device. In response, the SSD 202 will consume the NVMe command 204 from the associated SQ, process the command, and write back a completion queue element (CQE) to the completion queue 212 at the address space of the LNV device 200. As illustrated in FIG. 2, typical software implementations have pairs of SQs and CQs. In contrast, the hardware interface 208 only has SQs, and the CQs are instead implemented by the LNV device 200.

Figure 3:
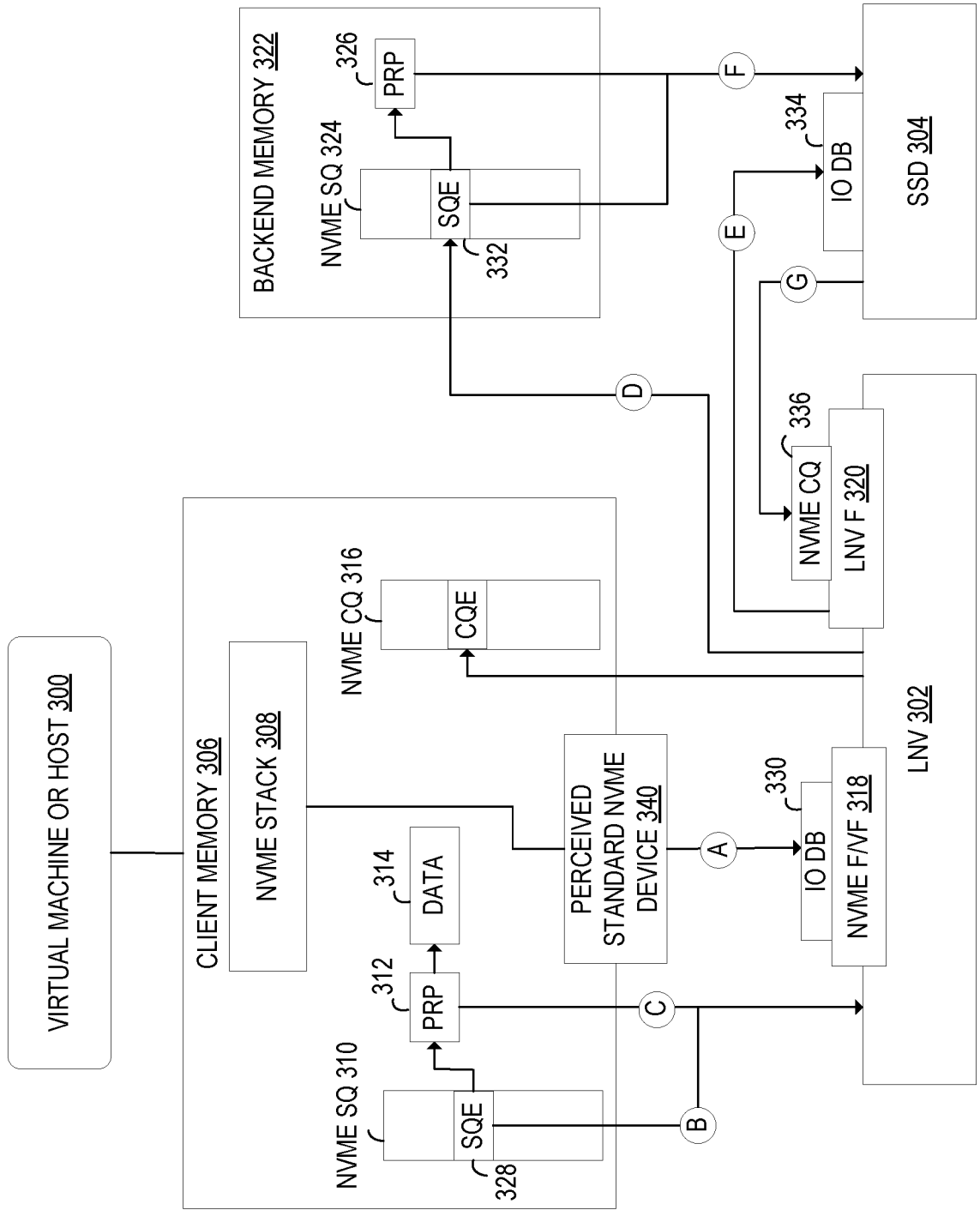
FIG. 3 shows an input/output control flow between a virtual machine, a local non-volatile memory express virtualization device, and a plurality of solid-state drive devices for the server system of FIG. 1.

FIG. 3 illustrates an input/output control flow between the VM 300, the LNV device 302, and the SSD (e.g. NVMe Device) 304. An NVMe stack 308 is included as a software component of the VM 300. Using client memory 306, the VM 300 may store an NVMe SQ 310, physical region page entries (PRP) 312 which point to data buffers for the data 314 that the VM 300 intends to read/write, and the NVMe CQ 316. The LNV device 302 has NVMe functions or virtual functions 318 and LNV function 320 that are PCIe functions. In a virtualized deployment model, the LNV device 302 exposes a virtual NVMe controller to the VM 300 using a virtual function. This virtual NVMe Controller presents the VM 300 with NVMe queue pair (QP), and Namespaces assigned to the VM 300 by a management stack. On the other hand, in a physical deployment model, such as a bare metal deployment model, or to expose the NVMe controller to a host in a virtualized environment, the LNV device 302 exposes a NVMe controller using a PCIe function.

The backend memory 322 is a separate memory subsystem from the client memory 306. The backend memory 322 includes an NVMe SQ 324 and PRP 326 that are allocated to the LNV device 302 for communication with the SSD 304, as described above with reference to FIG. 2.

In the input/output control flow, the virtual machine 300 uses a standard NVMe stack and writes data 314 to the data buffer. The virtual machine 300 may then update the PRP 312 to point to the data 314 to indicate that the data 314 is located at a specific data buffer. The virtual machine 300 may then write an NVMe command to the NVMe SQ 310 as a submission queue element (SQE) 328 in client memory 306. The SQE 328 directly or indirectly, using PRPs, refers to data buffers located in client memory 306. At (A), the NVMe stack 308 of the virtual machine 300 will ring the doorbell 330 of the LNV device 302 by writing to memory mapped PCIe address space of the LNV device 302.

The LNV device 302 detects and processes the write (e.g. doorbell ring) to the IO DB 330, which indicates that a new NVMe command has been placed into the NVMe SQ 310 in client memory 306. At (B), the LNV device 302 will then read the SQE 328 from the next location in the NVMe SQ 310 in client memory 306. At (C), for indirect data access examples, the LNV device 302 may also read PRPs from the client memory 306. Next, the LNV device 302 queues the NVMe command (e.g. SQE 328) internally and schedules for further processing based on a quality of service (QoS) configuration of the NVMe Controller namespace.

In one example, based on the namespace configuration, a single NVMe command (e.g. SQE 328) from the client memory 306 may result in multiple backend NVMe commands generated by the LNV device 302. For example, slice crossing or striping configurations may result in multiple backend NVMe commands. Backend NVMe commands are queued and processed separately by the LNV device 302, which may provide the potential benefit of avoiding stalling of the pipeline if a specific SSD 304 slower than the other SSDs.

At (D), the LNV device 302 builds and writes backend NVMe commands that are placed into the NVMe SQ 324 of backend memory 322 as SQE 332. The LNV device 302 may also write NVMe PRPs 326 to the backend memory 322. At (E), the LNV device 302 rings the doorbell 334 of the SSD 304 by writing to memory-mapped input/output (MMIO) space of the SSD 304.

The SSD 304 detects the write to its MMIO space (e.g. doorbell ring) that indicates that a new SQE 332 has been placed in the NVMe SQ 324 of backend memory 322. At (F), the SSD 304 may then read the SQE 332 and the PRP 326 from backend memory 322. The SSD 304 may then execute the NVMe command of the SQE 332, and accesses the data 314 in client memory 306 of the VM 300 indicated by the PRP 326. The SSD 304 reads or writes data to the addresses provided within NVMe command from the SQE 332 and PRPs 326. After executing the command, at (G), the SSD 304 may write to the NVMe CQ 336 inside of LNV MMIO space for the LNV device 302.

The LNV device 302 detects and processes the write to the NVMe CQ area inside of MMIO space for the LNV device 302. The LNV device 302 may then write CQ doorbell (DB) of the corresponding SSD CQ register to indicate completion of a single backend NVMe command. In one example, these writes may be batched. After all backend NVMe commands corresponding to the client NVMe command have been completed, the LNV device 302 may then generate and write NVMe completion to the NVMe CQ 316 located in client memory 306. The client NVMe stack 308 of the virtual machine 300 may then read and process the NVMe completion indicated by the completion queue element (CQE) 338 placed in the NVMe CQ 316 in client memory 306.

An important aspect of the I/O control flow described above is that the LNV device 302 controls the SQE 332 in the NVME SQ 324 and PRP 326 that are accessed by the one or more SSD devices 304. That is, the virtual machine or host software 300 that originates a read or write request does not ultimately control how that read or write request affects the one or more SSD devices 304. Rather, the NVMe stack 308 of the virtual machine or host software 300 generates an NVMe command and places that command into the NVMe SQ 310 in client memory 306 as SQE 328. The NVMe command is directed at the LNV device 302, which is exposing itself to the NVMe stack 308 of the virtual machine/host software 300 as a perceived standard NVMe device 340. Thus, from the perspective of the NVMe stack 308 of the virtual machine/host software 300, it is interacting with a standard NVMe device using standard protocols and I/O control flows. However, the LNV device 302 controls how that NVMe command will be translated into one or more new NVMe commands that may be directed to the one or more SSD devices 304.

As a specific example, the SSD device 304 may be shared between two different virtual machines. The LNV device 302 may be configured to assign a first portion of the SSD device 304 to a first VM and a second portion of the SSD device 304 to a second VM. From the perspectives of the two VMs, they are interacting with their own standard NVMe device. Thus, the NVMe stacks 308 of both VMs generate NVMe commands directed to the perceived standard NVMe device 340, which is the LNV device 302 being exposed to both VMs. Using internal mapping tables, the LNV device 302 may then determine how the NVMe commands from both VMs should be mapped to the SSD device 304. That is, the LNV device 302 may determine that NVMe commands originating from the first VM should be directed to the first portion of the SSD device 304, and NVMe commands originating from the second VM should be directed to the second portion of the SSD device 304.

Accordingly, the LNV device 302 may generate backend SQEs 332 that are placed into the backend NVME SQ 324 of backend memory 322 based on the internal mapping table. That is, read/write commands from the first VM will be translated into backend commands that are directed to the first portion of the SSD device 304, and read/write commands from the second VM will be translated into backend commands that are directed to the second portion of the SSD device 304. In this manner, the physical SSD device 304 may be shared among multiple VMs without the VMs being aware. Rather, each VM perceives itself as interacting with a standard NVMe device. In a similar manner, a read/write commands from a single VM may be spread among a plurality of SSD devices 304 using striping. That is, slices of a plurality of different SSD device 304 may be assigned to a particular VM 300. In this example, a single NVMe command for that VM may result in a plurality of backend NVMe commands being generated by the LNV device 302 for the different SSD devices 304 that have been assigned to that VM. Further, it should be appreciated that using the I/O control flows described above, SSD devices 304 may be allocated or deallocated to VMs 300 by the LNV device 302 without the VMs 300 being aware of the allocation.

Figure 4:
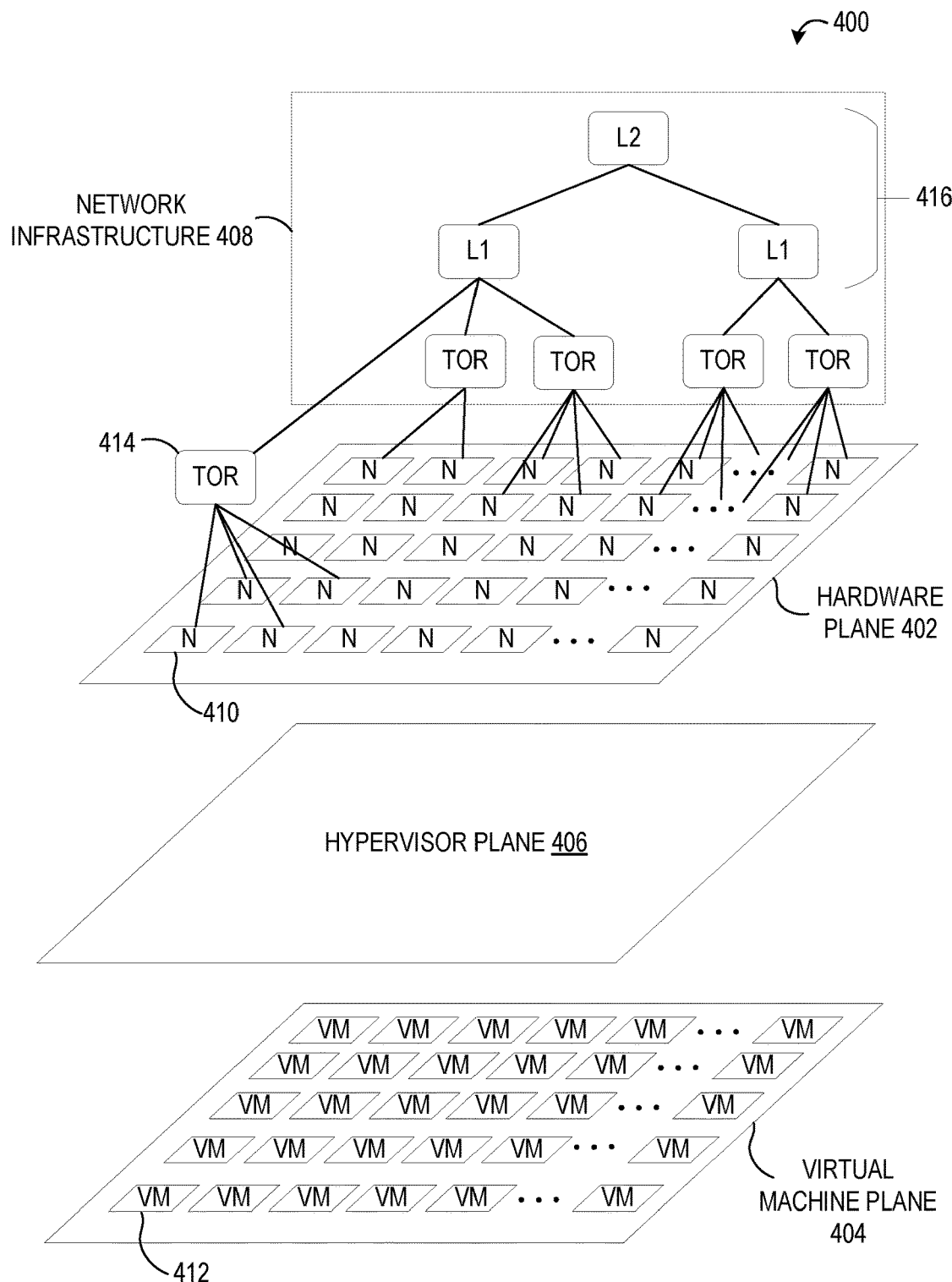
FIG. 4 shows a schematic view of an example datacenter for the server system of FIG. 1.

The system architectures and I/O control flows described above may be implemented on each of a plurality of compute nodes of a datacenter. For example, FIG. 4 illustrates a datacenter 400 that includes a hardware plane 402, a virtual machine plane 404, a hypervisor plane 406, and network infrastructure 408 that are collectively configured to operate the datacenter 400, which, for example, make take the form of a cloud platform. The example datacenter of FIG. 4 illustrates a virtualized platform. However, it will be appreciated that the NVMe device virtualization techniques described herein may also be applied to bare-metal platforms.

The hardware plane 402 includes a collection of compute nodes 410 (each denoted by the symbol "N" in FIG. 4) that may include processors, graphics processing units (GPU), volatile memory, SSDs operating as NVMe devices, LNV device, and other computer components. In a virtualized environment, the compute nodes 410 may be configured to execute host server instances configured to communicate with one or more hypervisors of the hypervisor plane 406. The one or more hypervisors of the hypervisor plane 406 may create, handle, and monitor a plurality of virtual machines 412 (each denoted by the symbol "VM" in FIG. 4) of the virtual machine plane 404. Through the hypervisor plane 406, each virtual machine 412 of the virtual machine plane 404 may be hosted and run by the hardware components of one or more nodes 410 of the hardware plane 402. In this manner, the plurality of virtual machines 412 of the virtual machine plane 404 may share virtualized hardware resources managed by the hypervisor plane 406. Each virtual machine 412 provides a simulated computer environment within which guest software may be executed.

In a bare-metal environment, each client entity may be allocated specific hardware resources of the compute nodes 410 of the hardware plane 402. For example, each client entity may be allocated a processor, storage, etc., of a compute node, and may execute software using those hardware resources of the allocated compute node.

In one example, the datacenter 400 communicatively couples the plurality of computer nodes 410 via standard network infrastructure 408. The network infrastructure 408 may include typical network infrastructure to couple compute nodes 410 within a node cluster together, such as server racks including top of rack (TOR) network switches 414. The datacenter 400 may include a plurality of node clusters that each have an associated TOR network switch 414. Network infrastructure 408 may further include higher-level switching infrastructure 416 (L1) and (L2) that connects the TOR network switches 414 together. The higher-level switching infrastructure 416 may take the form of any suitable networking architecture, and may be driven by any suitable routing protocol(s). In the illustrated example, the higher-level infrastructure 416 includes a collection of aggregation switches L1 and core switches L2. However, it will be appreciated that the higher-level switching infrastructure may include any suitable number of levels of switches.

In a virtualized environment for datacenter 400, each host server instance executed via the computer nodes 410 may communicate with other host server instances through the network infrastructure 408. The collective host server instances may manage the collective hardware resources of the hardware plane 402, which may be utilized to run the virtual machines 412 of the virtual machine plane 404 through the hypervisor plane 406. In one example, the virtual machines 412 utilization of the hardware resources of host compute nodes the hardware plane 402 is controlled by the hypervisor plane 406, and the virtual machines 412 may not directly access the nodes 410 themselves. The virtual machines 412 of the virtual machine plane 404 provide a virtual computing environment within which client entities may execute software. The hypervisor plane 406 may allocate the hardware resources of the compute nodes 410 in a changeable and scalable manner, such that additional compute nodes 410 may be allocated to a particular virtual machine 412, and already allocated compute nodes 410 may be reduced, transferred, or otherwise changed for that particular virtual machine 412. It should be appreciated that the datacenter 400 infrastructure described above and illustrated in FIG. 4 is merely exemplary, and that other networking infrastructures and organization methods not specifically described herein may also be utilized. For example, the datacenter 400 may instead take the form of a bare-metal datacenter environment.

Figure 5:
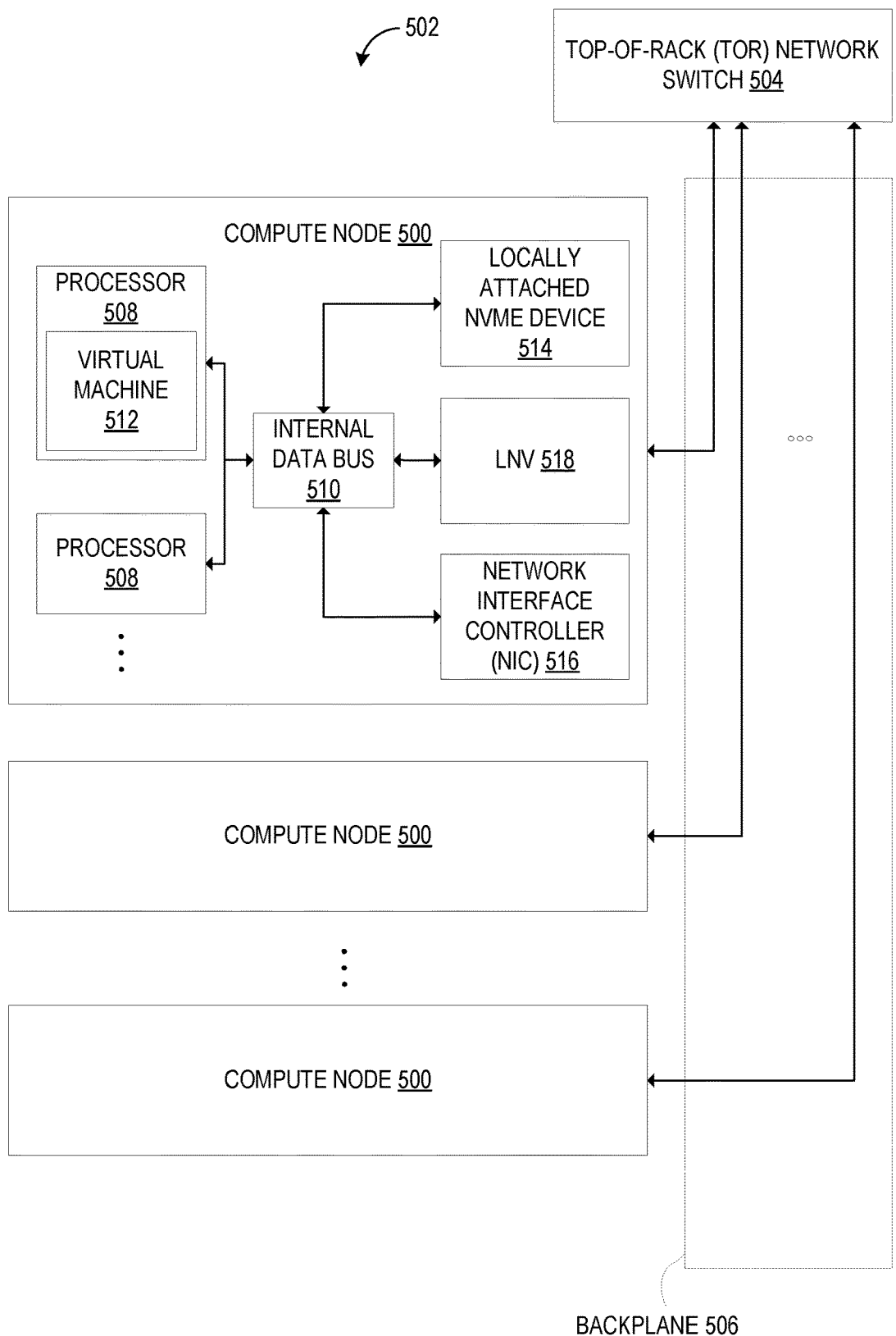
FIG. 5 shows an example compute node cluster for the example datacenter of FIG. 4.

Turning to FIG. 5, the plurality of compute nodes 500 may be organized into a plurality of compute node clusters 502. Each compute node cluster 502 may include a top of rack (TOR) network switch 504, two or more nodes of the plurality of compute nodes 500, and a backplane 506 communicatively coupling the top of rack network switch 504 and compute nodes 500. For example, each node cluster 502 may correspond to a server rack that provides physical structure, ventilation, etc., for a TOR switch 504 and a plurality of compute nodes 500 that are located physically proximate to each other in the same server rack. The backplane 506 communicatively coupling each node in the server rack may facilitate a low latency and high bandwidth exchange of network packets between nodes in the same server rack.

As illustrated in FIG. 5, each compute node 500 in the node cluster 502 includes at least one processor 508 communicatively coupled to other hardware components by an internal data bus 510. The at least one processor 508 may execute software to host virtual machines 512. As shown, each compute node 500 may include more than one processor 508 that may each execute separate virtual machines 512, or may collectively execute a single virtual machine. In one example, the internal data bus 510 may take the form of a Peripheral Component Interconnect Express (PCIe) link, for example. Data buses of other formats may alternatively be used. It should be appreciated that "internal" as used in the term "internal data bus" refers to the fact that at least a portion of the data bus is typically housed in the same housing (which serves as a Faraday cage) as the processor 508 of the node 500, and should be understood to encompass a data bus that connects a processor of a node in a housing with internally mounted hardware components and/or to externally coupled hardware components plugged into, e.g., a port on an external surface of the housing of the node.

As illustrated, each compute node 500 may include other suitable hardware components, such as, for example, one or more locally attached NVMe devices 514 (e.g. SSD devices coupled to PCIe data bus), a network interface controller (NIC) 516, an LNV device 518, etc. It should be appreciated that the compute nodes 500 are not limited to the illustrated hardware components, but may include any suitable configuration of hardware components configured for operating a datacenter. Additionally, it should be appreciated that while the compute nodes 500 are illustrated as being clustered in a server rack configuration, other types of network infrastructure and housing configurations may be utilized to couple the plurality of compute nodes 500 and operate the datacenter.

Figure 6:
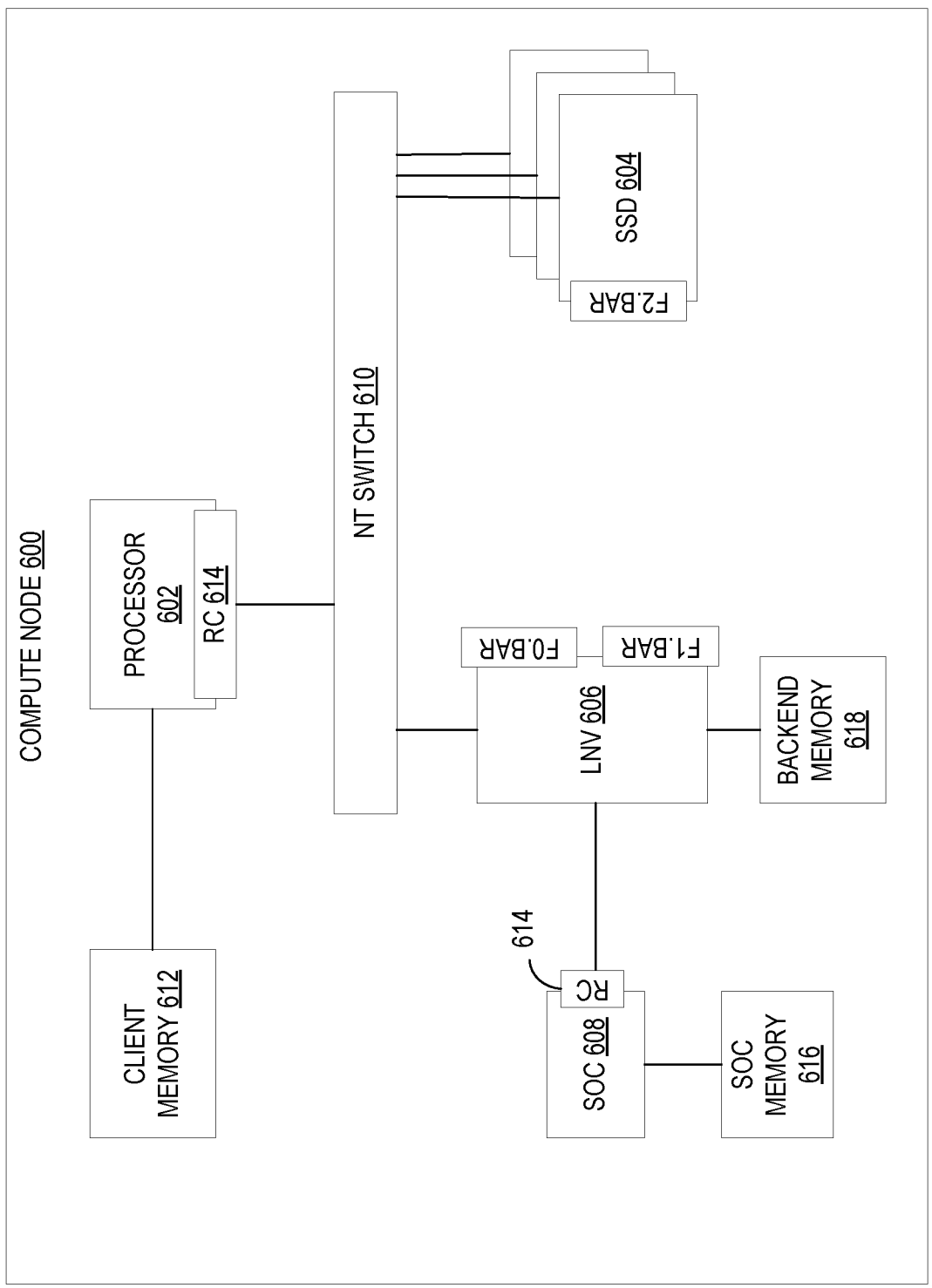
FIG. 6 shows a system architecture for a compute node that may be deployed in both virtualized and bare-metal environments, for the server system of FIG. 1.

FIG. 6 illustrates a system architecture for a compute node 600 that may be deployed in both virtualized and bare-metal environments. The compute node 600 includes one or more processors 602, one or more SSD devices 604, an LNV device 606, a system-on-chip (SoC) 608, and a non-transparent (NT) switch 610. These components are communicatively coupled via a PCIe system. Each processor 602 and associated client memory 612 and the SoC 608 and associated SoC memory 616 may be connected to the PCIe switch fabric of the PCIe system via root complexes (RC) 614. The RC 614 generates transaction requests on behalf of the processor 602 or SoC 608, which is interconnected through a local bus. In one example, each RC 614 may contain more than one PCIe port.

The NT switch 610 is a physical PCIe switch included in the PCIe system that includes functions for hiding the plurality of SSD devices 604 that are connected to the NT switch 610 from the connected one or more processors 602, such that the SSD devices 604 are not visible to software within the VM context being run on the processor 602 of the compute node 600. The SSD devices 604 may access NVMe commands generated by the LNV device 606 and access host data buffers directly via an upstream port of a PCIe switch, which may take the form of the NT switch 610.

In the example illustrated in FIG. 6, processors may enumerate and discover PCIe functions, such as F0, F1, F2, etc. Each of those PCIe functions has base address registers (BAR) which contain sets of registers that can be mapped to processor MMIO address space, such as, for example, the NVME DBs. Additionally, the NT switch 610 is configured such that the one or more processors 602 may discover and enumerate the PCIe function F0, and the SoC 608 may discover and enumerate the PCIe functions F1 and F2 shown in FIG. 6. Additionally, the NT switch 610 is configured such that the processors 602 are able to see and access the PCIe function F0 for the LNV device 606, but are not able to see and access the PCIe function F2 for the SSD devices 604. On the other than, the SoC 608 is able to see and access both the PCIe functions F1 and F2.

Additionally, the LNV device 606 is able access the F2.BAR of the SSD devices 604 using F1 requester identifier (RID), the processor's 602 client memory 612 using the F0 RID, and the SoC memory 616 using the F1 RID. The SSD devices 604 are able to access the F1.BAR of the LNV device 606 using the F2 RID, the SoC memory 616 using the F2 RID, and the client memory 612 of the processor 602 using the F0 RID.

To achieve these functions, the NT switch 610 is configured for at least two isolated domains. A first domain includes the one or more processors 602 and F0 of the LNV device 606. The second domain includes the SoC 608, F1 of the LNV device 606, and F2 of the SSD devices 604. In one example, the NT switch 610 is configured to allow the F2 of the SSD devices 604 to access both domains, and uses address range to forward PCIe transactions initiated by the SSD devices 604 to each domain. Further, in order to hide the SSD devices 604 from the one or more processors 602, the NT switch 610 is configured to cause all PCIe transactions initiated by the SSD devices 604 that target the one or more processors 602 to have the F2.RID of the SSD to be replaced with the F0.RID of the LNV device 606. In this manner, transactions from the SSD devices 604 to the processor 602 will appear to the processor 602 to originate from the LNV device 606, thus hiding the SSD devices 604 from the view of the processor 602.

Figure 7:
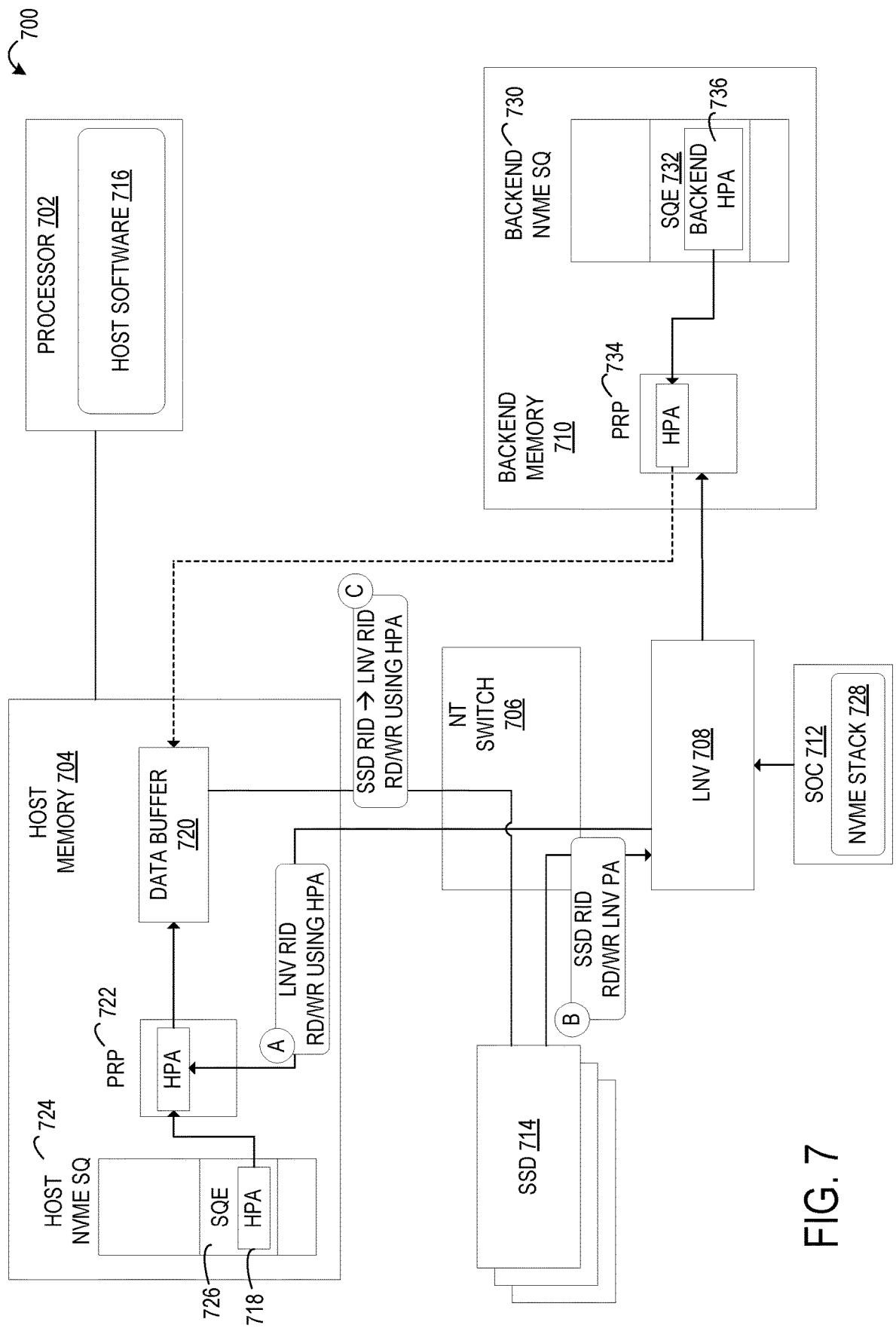
FIG. 7 shows an example system architecture and input/output control flow for performing solid-state drive virtualization that may be used for bare-metal platform configurations of the server system of FIG. 1.

FIG. 7 illustrates an example system architecture that may be used for bare-metal platforms. In a bare-metal configuration of a datacenter where the client entities are allowed direct control of software executed by the processor rather than a virtualized environment, the processor of the compute node cannot be trusted by the datacenter. In the example of FIG. 7, the compute node 700 includes one or more processors 702, host memory 704, an NT switch 706, an LNV 708, backend memory 710, an SoC 712, one or more SSD devices 714, and other suitable computing components. As the example compute node 700 is part of a bare-metal platform, client entities may run host software 716 that directly uses host memory 704 to perform the functions of the host software 716. As the host software 716 is being run within a bare-metal environment rather than a virtualized environment, the host software 716 uses host physical addresses (HPA) 718 of the host memory 704 directly, rather than global physical addresses (GPA) that are translated to HPAs in a virtualized environment.

Using the I/O control flow described above with reference to FIG. 3, the NVMe stack executed by the host software 716 writes data to a data buffer 720 of the host memory 704. The NVMe stack may then update the PRP 722 to point to the data to indicate that the data is located at a specific data buffer. As the example compute node 700 is a bare-metal platform, the PRP 722 may use HPA 718 to point to the data. The NVMe stack may then write an NVMe command to the host NVMe SQ 724 as a SQE 726 in host memory 704. The SQE 726 directly, using PRPs, refers to data buffers located in host memory 704 using HPA 718. The NVMe stack may then ring the doorbell of the LNV device 708. The LNV device 708 detects and processes the doorbell ring, and then initiates a PCIe transaction at (A) to read the SQE 726 from the next location in the host NVMe SQ 724 in host memory 704. In this example, the LNV device 708 is exposed to the host software 716 as an NVMe device.

The LNV device 708 is a trusted component of the datacenter that is designed to be resistant to attacks from the host software 716 that is controlled by an untrusted entity. Thus, the LNV device 708 may be exposed to the untrusted host software 716. On the other hand, the one or more SSD devices 714 may be standard SSD devices that may potentially store private data. Thus, as the host software 716 is an untrusted entity, the SSD devices 714 are not exposed to the host software 716, but are rather hidden behind the LNV device 708 according to the techniques described herein. Specifically, SSD devices 714 are hidden from the host software 716, and are enumerated and managed by the SoC 712 and the NVMe stack 728 running on SoC 712. Accesses to the NVMe control plane (NVMe IO Qs, commands, completions) are mastered by LNV device 708. In the data access model of FIG. 7, the LNV device 708 is responsible to access both the host NVMe commands and completions. The SSD devices 714 are responsible to access host data in host address space via PCIe transactions. In this manner, accesses to the data buffers 720 of the host memory 704 are mastered by the SSD devices, and do not consume LNV device 708 uplink bandwidth. In order to hide the fact that the SSD devices 714 are accessing the data buffers 720 from the host software 716, the NT switch 706 is configured to perform retagging techniques, which will be described in more detail below.

Returning to the I/O control flow of FIG. 7, the LNV device 708 builds and writes backend NVMe commands that are placed into the backend NVMe SQ 730 of backend memory 710 as SQE 732. The LNV device 708 also writes a PRPs 734 to the backend memory 710. The SQE 732 in the backend NVMe SQ 730 may point to the PRP 734 using backend HPA 736 of the backend memory 710. On the other hand, the PRP 734 references the HPA 718 of the host memory 704 to point to the specific data buffers 720 that store the relevant data. The LNV device 708 may then ring the doorbell of the SSD device 714.

The SSD device 714 detects the doorbell ring that indicates that a new SQE 732 has been placed in the backend NVMe SQ 730 of backend memory 710. Thus, at (B), the SSD device 714 may initiate a PCIe transaction to read the SQE 732 and the PRP 734 from backend memory 710. It should be appreciated that in this data access model, the LNV device 708 is a trusted hardware component, and the SSD devices 714 and the LNV device 708 are aware and visible to each other over the PCIe data bus. Thus, the PCIe transaction at (B) may use the SSD device 714 RID, and uses physical address space of the LNV device 708 and backend memory 710.

The SSD 714 may then execute the NVMe command of the SQE 732, and accesses the data in host memory 704 indicated by the PRP 734. To access the data, the SSD device 714 initiates a PCIe transaction at (C) to read or write data to the addresses indicated by the HPA 718 of the host memory 704 indicated in the PRP 734. As discussed above, in this data access model, the SSD device 714, and therefore any PCIe transactions from the SSD device 714 are hidden from the host software 716. In one example, to hide the SSD devices 714, the SSD devices 714 may instead access the data of the host memory 704 through the LNV device 708. That is, the SSD device 714 may request the LNV device 708 to access the data in the data buffer 720 of host memory 704, and the LNV device 708 may access and send that data to the requesting SSD device 714. In this manner, the host software 716 only interacts with the LNV device 708. However, in this example, data transfer may be limited by the uplink of the LNV device 708.

In another example, the SSD device 714 may initiate the PCIe transaction at (C) to access the data of the data buffer 720 of host memory 704 itself. However, PCIe transactions typically include an RID which indicates an identifier for the device that initiated the transaction. In order to hide the existence of the SSD device 714 from the host software 716, the NT switch 706 is configured to perform tag remapping to change an RID of the PCIe transaction at (C) from the SSD device 714 RID to the LNV device 708 RID. Thus, from the perspective of the host software 716, the PCIe transaction at (C) to access the data buffer 720 of host memory 704 originated from the LNV device 708. In this manner, the SSD devices 714 may directly access data of the data buffer 720 of host memory 704 while still remaining hidden from the host software 716. Specifically, the NT switch 706 may be configured to allow controlled upstream access of SSD devices 714 to the data buffers 720 in the host memory 704, and further prohibit downstream access by the host software 716 to SSD device 714 BAR.

Figure 8:
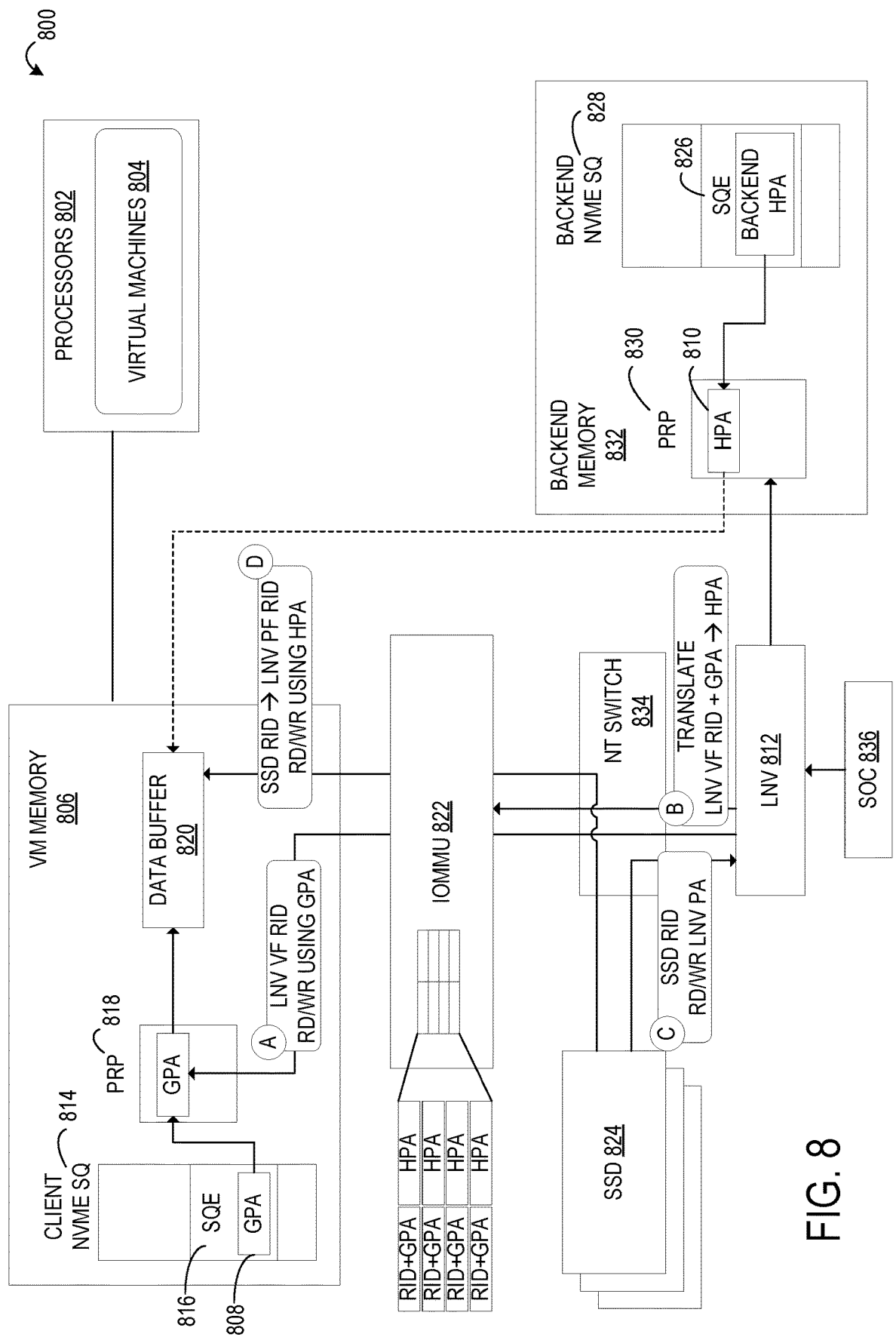
FIG. 8 shows an example system architecture and input/output control flow for performing solid-state drive virtualization that may be used for virtualized platform configurations of the server system of FIG. 1.

FIG. 8 illustrates an example system architecture that may be used for virtualized platforms. In a virtualized configuration of a datacenter, multiple entities may be running software within a plurality of virtual machines that share hardware resources. For example, the compute node 800 may include one or more processors 802 running multiple VMs 804. Each VM 804 may be assigned VM memory 806 by the hypervisor that maps guest physical addresses (GPA) 808 for the VM 804 to HPAs 810 of the host memory of the compute node 800 that stores the data. Using the I/O control flow described with reference to FIG. 3, the NVMe stack of the VM 804 will use the GPAs 808 assigned to that VM 804 when generating NVMe commands.

In the virtualized configuration of FIG. 8, the LNV device 812 may be configured to include both physical PCI functions and virtual PCI functions. As a specific example, the LNV device 812 may be configured to use single root input/output virtualization (SR-IOV) that allows the isolation of PCIe resources. Using SR-IOV, a single physical PCIe bus may be shared in a virtual environment using the SR-IOV specification. Physical functions (PF) are fully featured PCIe functions that may be discovered, managed, and manipulated as described herein, and may be used to configure and control a PCIe device. On the other hand, virtual functions (VF) are PCIe functions that are associated with a PF. A VF is a lightweight PCIe function that shares one or more physical resources with the PF and with VFs that are associated with that PF.

In the SR-IOV enabled PF of the LNV 812, the PCI configuration space of each VF can be accessed by the bus, device, and function number of the PF. Each VF has a PCI memory space, which is used to map its register set. The VF device drivers operate on the register set to enable its functionality and the VF may be assigned to an I/O domain. This capability enables VF to perform I/O.

In the I/O control flow for FIG. 8, the LNV device 812 is configured to expose a virtual NVMe device to the VMs 804. The virtual NVMe device has a VF as described above, and an RID for that VF. The VMs 804 may be configured to communicate with the virtual NVMe device using the VF. Similarly to the control flow of FIG. 3, the LNV device 812 is configured to process the client NVMe commands generated by the VMs 804, and deliver client NVMe completions to those VMs 804. As illustrated in FIG. 8, client NVMe commands generated by the NVMe stack for a VM 804 are placed into a client NVMe SQ 814 as SQE 816. The SQE 816 and PRPs 818 refer to the data buffers 820 using GPAs.

To translate between GPAs 808 of the VMs 804 and HPAs 810 of the host memory of the compute node 800, the compute node 800 may be further configured to implement an input-output memory management unit (IOMMU) 822. The IOMMU 822 is a memory management unit (MMU) that connects a direct-memory-access-capable (DMA-capable) I/O bus to the main memory. The IOMMU 822 translates processor-visible virtual addresses to physical addresses, and maps device-visible virtual addresses to physical addresses. In one example, the IOMMU 822 is a graphics address remapping table (GART) used by PCIe devices.

The IOMMU 822 is configured to allow the LNV device 812 to access VM GPA space in VM memory 806 using the VF RID of the LNV device 812. After the SQE 816 and PRPs 818 have been generated by the NVMe stack of the VM 804, the LNV device 812 may initiate a PCIe transaction at (A) to access the SQE 816 and PRP 818 using the VF RID of the LNV device 812. As discussed above, the SQE 816 and PRP 818 retrieved from VM memory 806 use GPAs 808 to refer to the stored data. However, the SSD devices 824 typically do not support SR-IOV or multiple functions, and thus are typically not granted access to the GPA space of VM memory 806 by the IOMMU 822. Thus, the LNV device 812 is configured to perform functions to get the GPA 808 referenced by the SQE 816 and PRP 818 translated into corresponding HPAs 810, which would allow the SSD devices 824 to directly access the data buffers 820 of VM address space in the host memory of compute node 800.

To allow typical SSD device 824 to access to the data buffers 20 within VM address space, LNV device 812 is configured to use address translation services (ATS) to translate GPAs from client NVMe commands such as SQE 816 and PRPs 818 to HPAs 810. The LNV device 810 may then populate backend NVMe commands and PRPs with HPAs 810. As shown in FIG. 8, the LNV device 812 may generate SQEs 826 that are placed into the backend NVME SQ 828 and PRPs 830 that stored in backend memory 832.

As illustrated in FIG. 8, to translate GPAs from client NVMe commands and PRPs to corresponding HPAs, the LNV device 812 is configured to, at (B), send an ATS translate request to the IOMMU 822. The LNV device 812 may send an ATS translate request for each GPA 808 address referring to the data buffer 820. The ATS translate request at (B) may be sent using the VF RID of the LNV device 812 and further includes the GPA 808 to be translated. The IOMMU 822 is configured to allow the VF RID access to the ATS, and translates the GPA 808 into the corresponding HPA 810 based on internal mapping tables. The IOMMU 822 sends a response to the LNV device 812 that includes the corresponding HPA for that ATS translate request. The LNV device 812 may then update the backend NVMe command that was placed into the backend NVMe SQ 828 and/or PRP 830 with the translated HPA 810. In this manner, each GPA 808 of the SQEs 816 and PRPs 818 may be translated into corresponding HPAs 810, which allows the SSD devices 824 to then use HPAs and SSD PCIe function reads to access VM data buffers 820.

For example, the SSD devices 824 may initiate a PCIe transaction, at (C), to retrieve the SQE 826 placed in backend NVMe SQ 828 and PRP 830 from backend memory 832. Next, the SSD device 824 may initiate a PCIe transaction, at (D), to access the VM data buffers 820 using the HPAs 810. Similarly to the process described with reference to FIG. 7, in order to hide the SSD devices 824 from the VMs 804, the NT switch 834 may be configured to remap the SSD RID for the PCIe transaction at (D) to the LNV PF RID, such that the VMs 804 perceive that they are interacting with the LNV device 812. Further, as the LNV PF RID is a physical function rather than a virtual PCIe function, the IOMMU 822 may be configured to allow the use of HPAs 810. It should be appreciated that this process is transparent to the SSD devices 824 as the SSD devices 824 are using translated HPAs to access data buffers 820 in VM memory 806.

Figure 9:
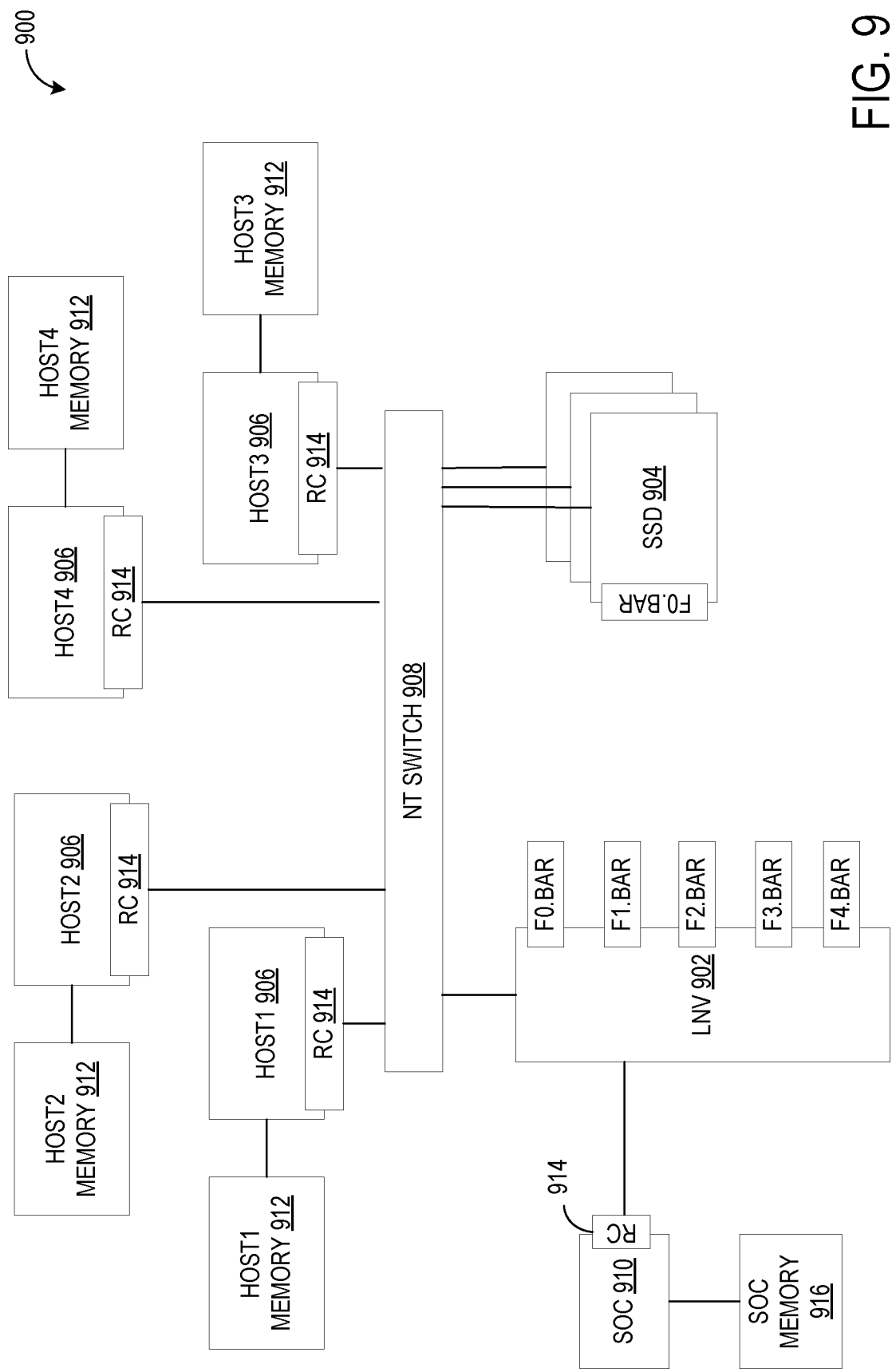
FIG. 9 shows a multi-host configuration that shares a same set of solid-state drive devices among a plurality of compute nodes for a plurality of hosts using the server system of FIG. 1.

FIG. 9 illustrates a multi-host configuration 900 that shares a same set of LNV device 902 and SSD devices 904 among a plurality of compute nodes for a plurality of hosts 906. Each host may include separate host memory devices 912. The plurality of hosts 906, the LNV device 902, and the SSD devices 904 are interconnected via a PCIe bus and the NT switch 908 and the RCs 914. The NT switch 908 is configured to create multiple PCI domains. For example, the NT switch 908 may be configured to create separate PCI domains for HOST1, HOST2, HOST3, HOST4, etc. Each of these domains will not be visible to each other. Each PCI domain will see one PCI function of the LNV device 902. For example, HOST 1 may see the function F1.BAR, HOST 2 may see the function F2.BAR, HOST3 may see the function F3.BAR, and HOST4 may see the function F4.BAR. Similarly the SoC 910 may be an infrastructure host that includes SoC memory 916, and is part of an infrastructure PCI domain that includes the SoC 916, the LNV device 902, and the plurality of SSD devices 904. The SoC 910 may see the function F0.BAR. Each PCI domain may communicate with the LNV device 902 via the respective functions exposed to their PCI domain.

In this configuration, each separate host 912 will see a single NVMe device, which is the LNV device 902. The LNV device 902 is configured to pool the plurality of SSD devices 904, and virtualize the resources of the plurality of SSD devices 904 to be used by the plurality of hosts 912. Each host 912 is unaware that other hosts 912 exist that are using the same set of SSD devices 904. The I/O control flows and techniques described above with reference to FIGS. 3, 7, and 8 may be used to virtualize the resources of the plurality of SSD devices 904 to be shared among the plurality of hosts 912.

Figure 10:
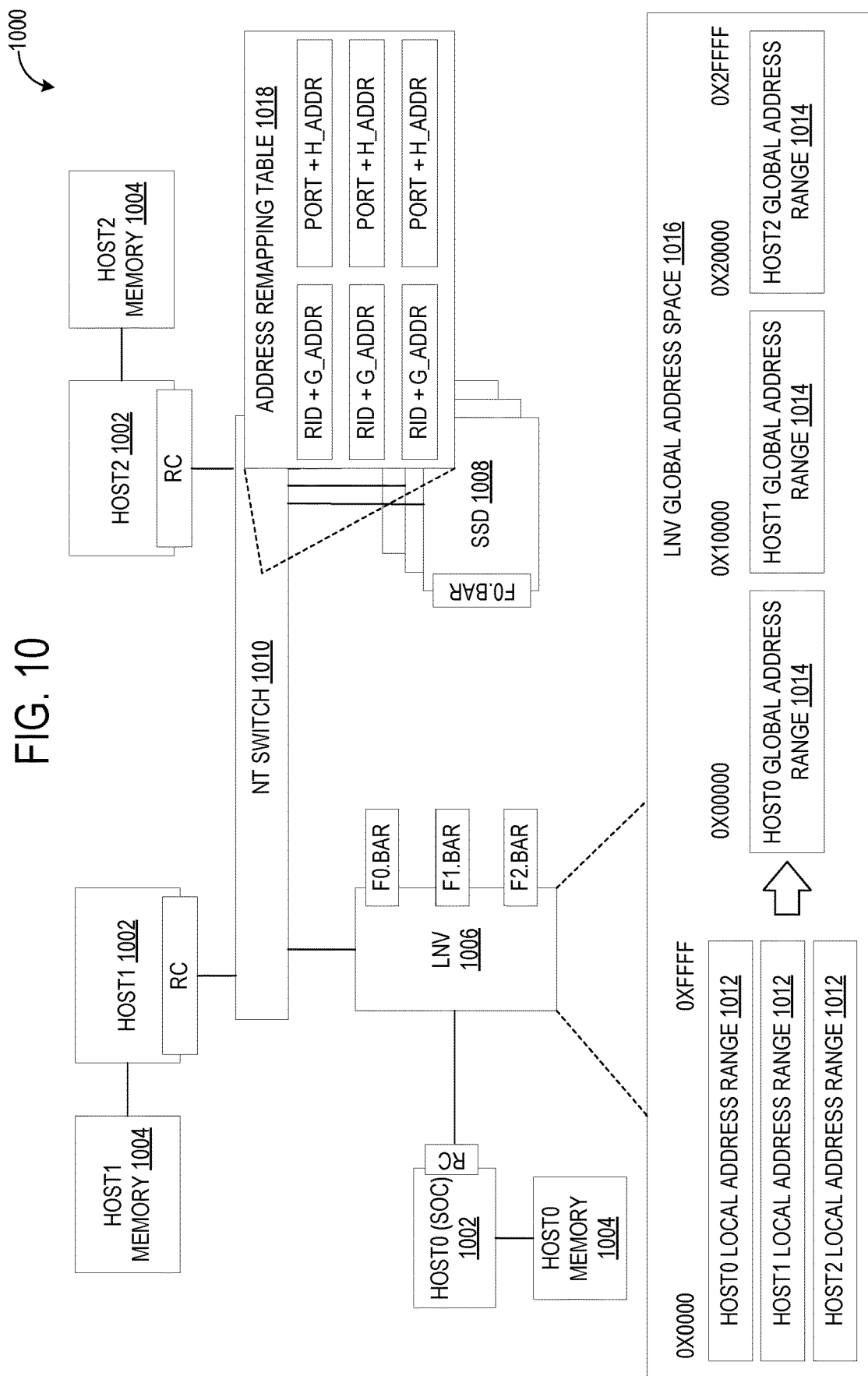
FIG. 10 shows an example multi-host configuration that uses an address remapping table to overlap host memory address spaces using the server system of FIG. 1.

FIG. 10 illustrates an example multi-host configuration 1000 that uses an address remapping table to overlap host memory address spaces. The multi-host configuration includes a plurality of hosts 1002 that include host memory 1004. The plurality of hosts 1002, an LNV device 1006, and a plurality of SSD devices 1008 are interconnected via a PCIe bus and the NT switch 1010. Each of the plurality of hosts 1002 will reference memory using a local address range 1012, such as, for example, a range from 0x0000 to 0xffff. However, it should be appreciated that this address range is merely exemplary, and that the plurality of hosts 1002 may reference memory using any suitable memory ranges. Further, it should be appreciated that the local address ranges 1012 for each host 1002 will overlap. That is, for example, if the LNV device 1006 attempts to access data from a memory address '0', that address exists for each host 1002. To address this issue, the LNV device 1006 and NT switch 1010 are configured to translate between local address ranges 1012 and global address ranges 1014 managed by the LNV device 1006.

As illustrated in FIG. 10, the LNV device 1006 is configured to manage a global address space 1016. The LNV device 1006 is configured to stack the local address ranges 1012 of the plurality of hosts 1002, such that there are not overlapping addresses. For example, the local address range 1012 for host0 may be mapped to a global address range 1014 that starts at address 0x00000. The local address range 1012 for host1 may then be stacked within the global address space, and mapped to a global address range 1014 that starts at 0x10000. Similarly, the local address range 1012 for host2 may be stacked within the global address space, and mapped to a global address range 1014 that starts at 0x20000 and ends at 0x2ffff. It should be appreciated that the address ranges described herein are merely exemplary, and that any size of address ranges may be used for the local and global address ranges. In this manner, the LNV device 1006 will manage the global address space 1016 that includes all of the local address ranges of the plurality of hosts 1002 in the multi-host configuration 1000.

Additionally, the NT switch 1010 is configured to manage an address remapping table 1018 that maps addresses from the global address space 1016 back to specific hosts 1002 and a local address range 1012 of that host. For example, when an SSD device 1008 initiates a PCIe transaction for the I/O control flow described herein, the SSD device 1008 will send both a RID of the SSD device 1008 and a global address (G_ADDR).

The NT switch 1010 will process the PCIe transaction and consult the internal address remapping table 1018. Based on the G_ADDR, the NT switch 1010 will identify the local address range 1012 of a host that is associated with that G_ADDR during the process described above. The NT switch 1010 will then map the G_ADDR to an egress port of the NT switch 1010 that routes to the host 1002 that is associated with that G_ADDR, and remaps the G_ADDR to a host address (H_ADDR) in the local address range 1012 of that host 1002. In this manner, the LNV device 1006 shifts local addresses to a global address space, and the NT switch 1010 shifts a global address back to a local address of a specific host.

Figure 11:
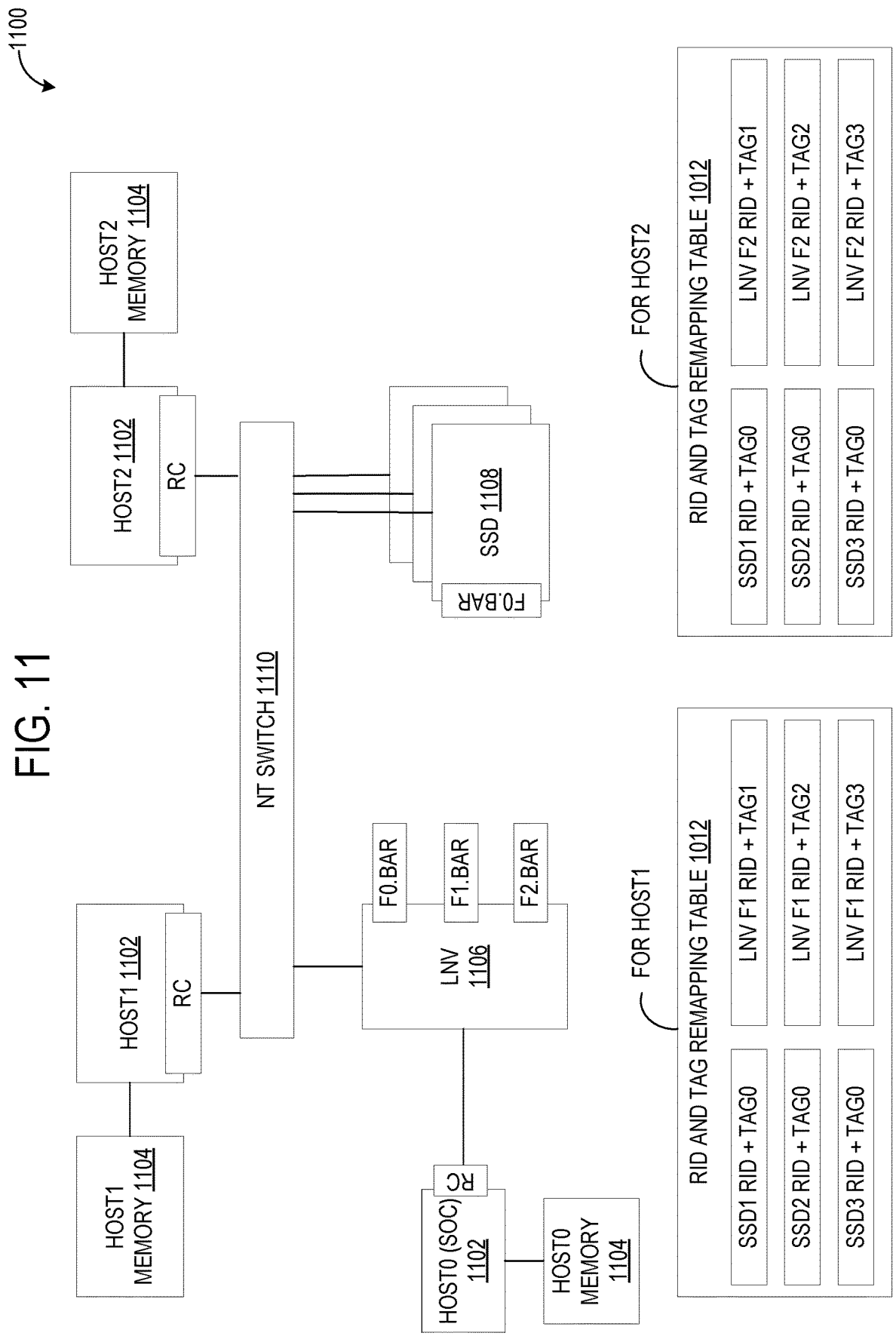
FIG. 11 shows an example of RID and tag remapping performed by the NT switch of the server system of FIG. 1.

FIG. 11 illustrates an example of RID and tag remapping performed by the NT switch. As discussed above, the SSD devices 1108 are hidden from view of the hosts 1102. When one of the SSD devices 1108 initiates a read/write request to one of the hosts 1102, that request includes a RID of that SSD device (e.g. SSD1 RID, SSD2 RID, SSD3 RID), in addition to a memory address for the request. Read requests may also include a tag, such as tag0, to tag the data that will be sent back to the SSD device. To hide the existence of the SSD device 1108 from the hosts 1102, the NT switch 1110 is configured to perform RID remapping.

As illustrated, using a RID and TAG remapping table 1012, the NT switch 1110 may be configured to remap the SSD RID used in the request to the LNV RID. Specifically, the NT switch 1110 will remap the RID to the LNV function RID for the PCIe domain of the target host 1102 of that request. For example, if the first SSD device is making a request to host1, then the NT switch 1110 may be configured to remap the SSD1 RID in the request to the LNV F1 RID to route the request to the host1. As another example, if the second SSD device is making a request to host2, then the NT switch 1110 may be configured to remap the SSD2 RID in the request to the LNV F2 RID to route the request to the host2. In this manner, each host 1102 will see that the request was initiated from the LNV device 1106, and the SSD device 1108 will not be visible.

As discussed above, read requests will also include a tag, such as tag0, tag1, tag2, etc. Each SSD device 1108 will keep track of its own tags. Thus, there will be overlapping tags between the plurality of SSD devices 1108. To address this issue, the NT switch 1110 is also configured to perform tag remapping. For example, the NT switch 1110 may further keep track of tag remapping using the RID and tag remapping table 1012. For example, the NT switch 1012 may remap tag0 for a request from the first SSD device to tag1, remap tag0 for a request from the second SSD device to tag2, and remap tag0 for a request from the third SSD device to tag3. Completion of the read request will also include a corresponding tag that was sent to the host for the request, and the NT switch 1110 may remap those tags back to the local tag of the respective SSD device 1108 using the table 1012. In this manner, the local tags used in the context of each SSD device 1108 may be stacked into a global tag system managed by the NT switch 1110.

Figure 12:
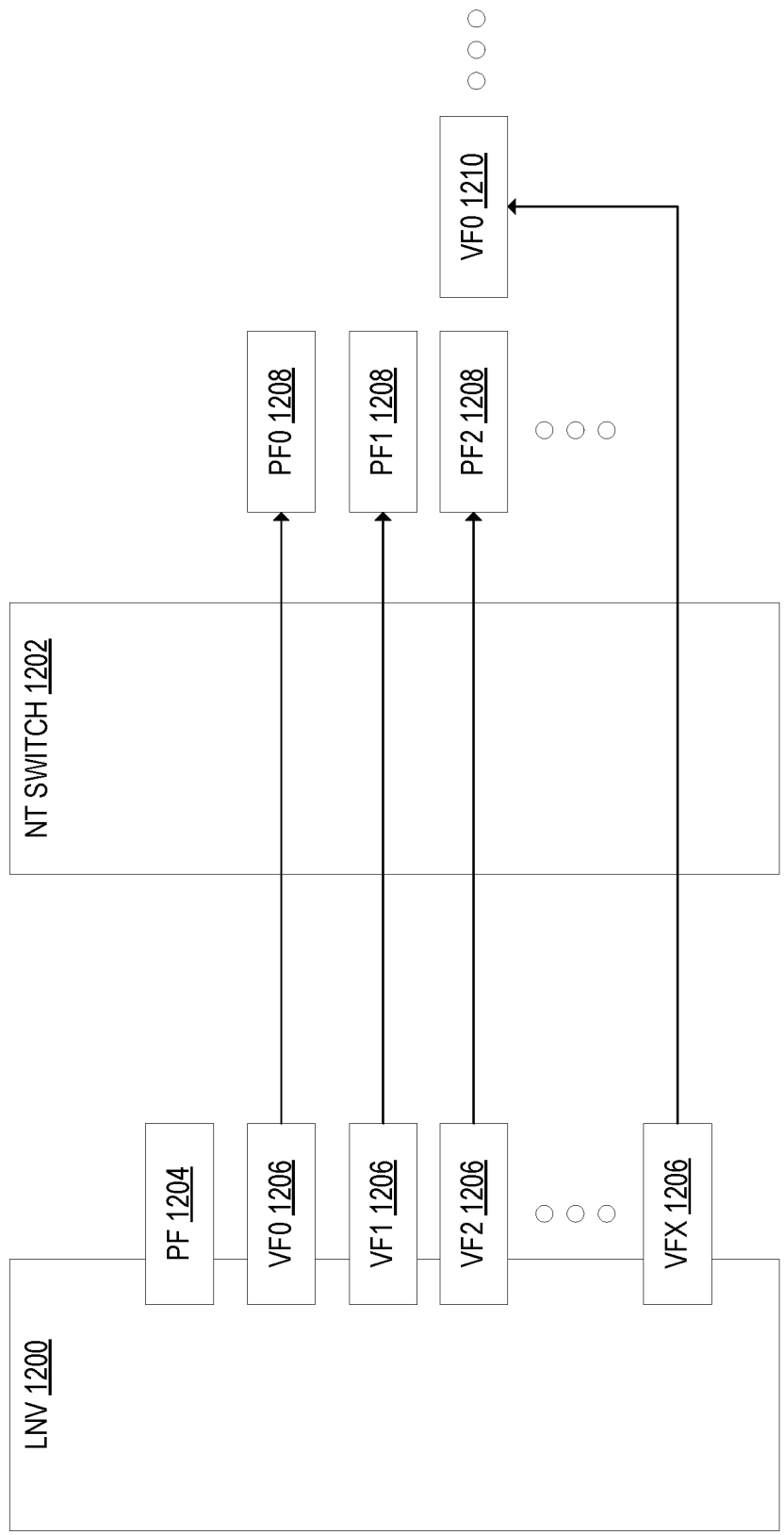
FIG. 12 shows an example of mapping virtual functions to physical functions for the local non-volatile memory express virtualization device for the server system of FIG. 1.

FIG. 12 illustrates an example of mapping virtual functions (VF) to physical functions (PF) for the LNV device. In some examples, the LNV device 1200 may be configured to include a single PF 1204. However, to have additional PCI domains for a plurality of hosts, additional PCI functions for the LNV device 1200 may be required. In the example of FIG. 12, the LNV device 1200 includes a single PF 1204, but also supports a plurality of VFs 1206 such as VF0, VF1, VF2, etc. In this example, the NT switch 1202 may be configured to map those VFs 1206 to PFs 1208 of the NT switch 1202, and to present those VFs 1206 as the PFs 1208. In this manner, VFs 1206 such as VF0, VF1, etc., of the LNV device 1200 may be presented to other devices interconnected by the PCIe bus as physical functions 1208 PF0, PF1, PF2, etc., even though the LNV device 1200 only supports a single PF 1204. Thus, the example configuration of FIG. 12 may allow an LNV device 1200 to support a number of hosts based on the number of VFs supported by the LNV device 1200.

In another example, the NT switch 1202 may be further configured to present a subset of the VFs of the LNV device 1200 as VFs 1210 associated with one of the PFs 1208 represented by the NT switch 1202. In this manner, the NT switch 1202 may be capable of performing this remapping to expose ST-IOV capable PFs and VFs, even though the LNV device 1200 may only be configured for a single PF.

Figure 13:
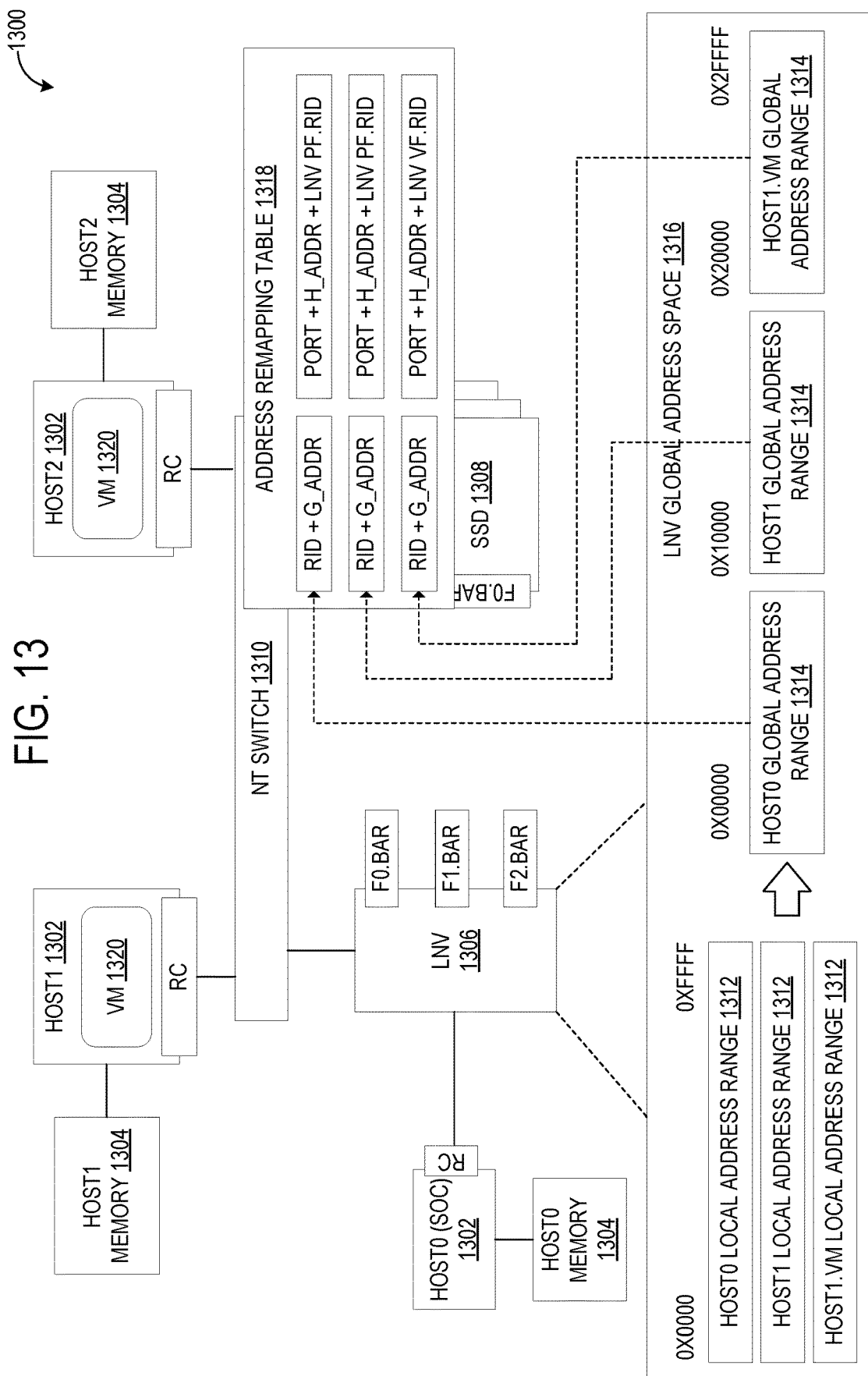
FIG. 13 shows an example multi-host configuration that uses an address remapping table to overlap host memory address spaces that is extended to further include virtual machines for the server system of FIG. 1.

FIG. 13 illustrates an example multi-host configuration 1300 that uses an address remapping table to overlap host memory address spaces that is extended to further include VMs. The multi-host configuration includes a plurality of hosts 1302 that include host memory 1304. The plurality of hosts 1302, an LNV device 1306, and a plurality of SSD devices 1308 are interconnected via a PCIe bus and the NT switch 1310. The plurality of hosts 1302 may also be configured for a virtualized environment, and may be configured to run VMs 320. Each of the plurality of hosts 1002 and the plurality of VMs 1320 will reference memory using a local address range 1312 from 0x0000 to 0xffff. Thus, the local address ranges 1312 for each host 1302 and VM 1320 will overlap. To address this issue, the LNV device 1306 and NT switch 1010 are configured to translate between local address ranges 1312 and global address ranges 1314 managed by the LNV device 1306.

As illustrated in FIG. 13, the LNV device 1306 is configured to manage a global address space 1316. The LNV device 1306 is configured to stack the local address ranges 1312 of the plurality of hosts 1302 and VMs 1320, such that there are not overlapping addresses. For example, the local address range 1312 for host0 may be mapped to a global address range 1314 that starts at address 0x00000. The local address range 1312 for host1 may then be stacked within the global address space, and mapped to a global address range 1314 that starts at 0x10000. Further, the local address range 1312 for VM1 being run on host1 may be stacked within the global address space, and mapped to a global address range 1314 that starts at 0x20000 and ends at 0x2ffff. It should be appreciated that the address ranges described herein are merely exemplary, and that any size of address ranges may be used for the local and global address ranges. In this manner, the LNV device 1306 will manage the global address space 1316 that includes all of the local address ranges of the plurality of hosts 1302 and VMs 1320 in the multi-host configuration 1300.

Additionally, the NT switch 1310 is configured to manage an address remapping table 1318 that maps addresses from the global address space 1316 back to specific hosts 1302 or VMs 1320, and a local address range 1312 of that host/VM. For example, when the SSD device 1308 initiates a PCIe transaction for the I/O control flow described herein, the SSD device 1308 will send both an RID for the SSD device 1308 and a global address (G_ADDR).

The NT switch 1310 will process the PCIe transaction and consult the internal address remapping table 1318. Based on the G_ADDR, the NT switch 1310 will identify an egress port of the NT switch 1310 that routes to a host 1302 associated with that G_ADDR, and remaps the global address to a host address (H_ADDR) in the local address range 1312 of that host 1302. In this manner, the LNV device 1306 shifts local addresses to a global address space, and the NT switch 1310 shifts global address back to a local address of a specific host.

Additionally, the NT switch 1318 may be further configured to remap the RID based on whether the request is being routed to a host 1302 or VM 1320. For example, the NT switch 1318 may be configured to remap the RID for the SSD device to an LNV PF RID for hosts 1302, and remap to an LNV VF RID for VMs 1320.

Figure 14:
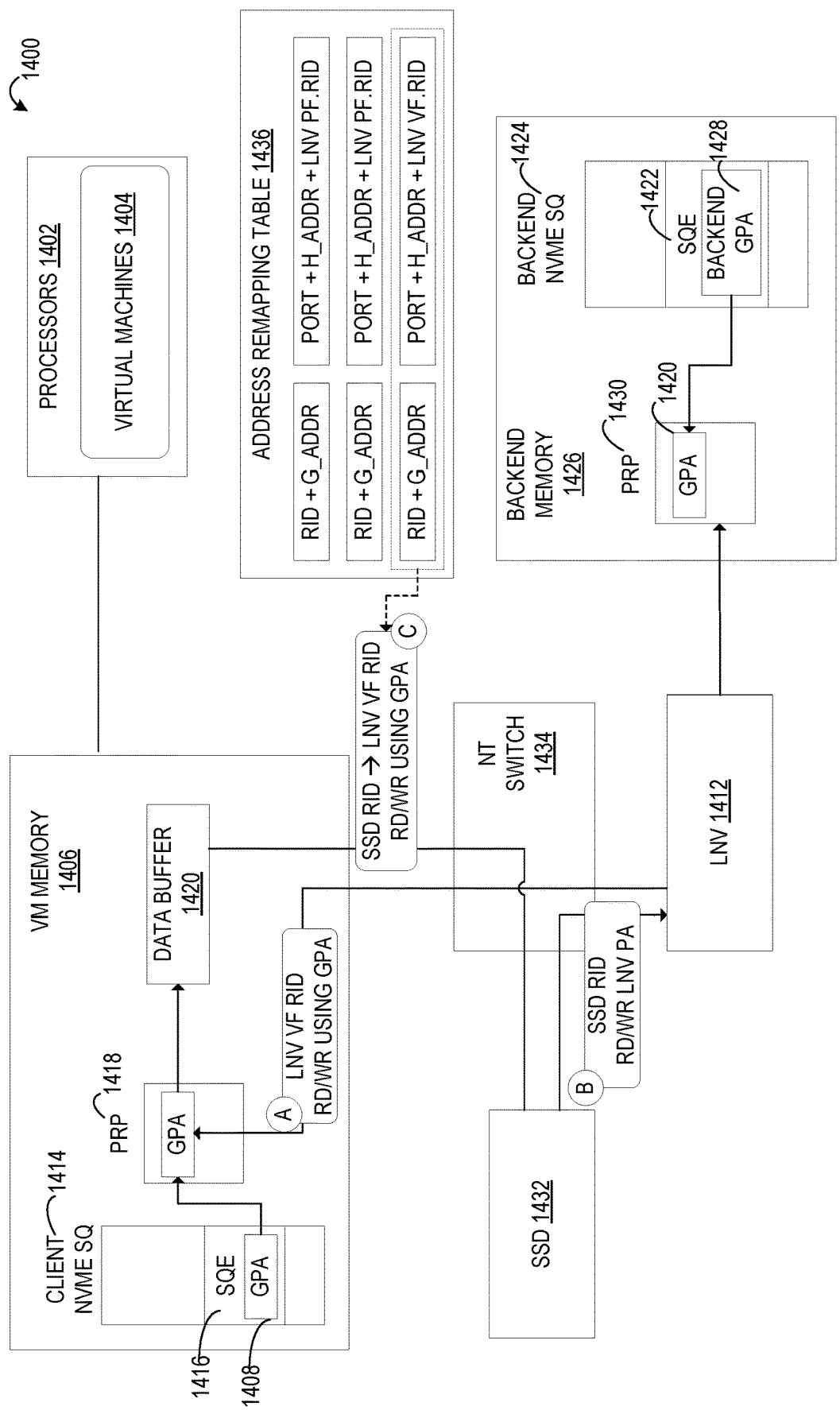
FIG. 14 shows an example system architecture and input/output control flow that includes address remapping, RID remapping, and tag remapping for the server system of FIG. 1.

FIG. 14 illustrates an example system architecture 1400 that may be used for virtualized platforms by using the address, RID, and tag remapping techniques described above with reference to FIG. 13. Each compute node may include one or more processors 1402 running multiple VMs 1404. Each VM 1404 may be assigned VM memory 1406 by the hypervisor that maps GPAs 1408 for the VMs 1404 to address of host memory. Using the I/O control flow described with reference to FIG. 3, the NVMe stack of the VM 1404 will use the GPAs 1408 of VM memory 1406 for the VM 1404 when generating NVMe commands.

In the virtualized configuration of FIG. 14, the LNV device 1412 may be configured to include both physical PCI functions and virtual PCI functions, as described above. In the I/O control flow for FIG. 14, the LNV device 1412 is configured to expose a virtual NVMe device to the VMs 1404. The virtual NVMe device has a VF as described above, and an RID for that VF. The VMs 1404 may be configured to communicate with the virtual NVMe device using the VF. Similarly to the control flow of FIG. 3, the LNV device 1412 is configured to process the client NVMe commands generated by the VMs 1404, and deliver client NVMe completions to those VMs 1404. As illustrated in FIG. 14, client NVMe commands generated by the NVMe stack for a VM 1404 are placed into a client NVMe SQ 1414 as SQE 1416. The SQE 1416 and PRPs 1418 refer to the data buffers 1420 using GPAs. Further, the GPAs 1408 are in a local address range for that VM 1404.

As discussed above, a plurality of VMs 1404 may be running, each VM 1404 having separate local address ranges that are overlapping. To address this issue, the LNV device 1412 is configured to stack the local address ranges of each host and VM 1404 into a global address range, as shown in FIG. 13. For example, after the SQE 1416 and PRPs 1418 have been generated with reference to GPAs 1408 in the local address range by the NVMe stack of the VM 1404, the LNV device 412 may initiate a PCIe transaction at (A) to access the SQE 1416 and PRP 1418 using the VF RID of the LNV device 1412. As discussed above, the SQE 1416 and PRP 1418 retrieved from VM memory 1406 use GPAs 1408 to refer to local address space of the data buffers 1420 of VM memory 1406. However, the local address spaces of multiple hosts and VMs 1404 will overlap. Thus, the LNV device 1412 is configured to shift the GPAs 1408 from local address space to GPAs 1420 of global address space managed by the LNV device 1412 using the techniques described above with reference to FIG. 13.

The LNV device 1412 may generate backend NVMe commands and place those commands as SQEs 1422 in the backend NVME SQ 1424 of backend memory 1426. The SQE 1422 may use backend GPAs 1428 to point to location in backend memory 1426 that have the PRPs 1430 that include the GPAs 1420 in global address space managed by the LNV 1412.

At (B), an SSD device 1432 may retrieve the SQE 1422 placed in backend NVMe SQ 1424 and PRP 1430 from backend memory 1426. Next, the SSD device 1432 may initiate a PCIe transaction, at (C), to access the VM data buffers 1420 using the GPAs 1420 in global address space retrieved from backend memory 1426. Using the techniques described above with reference to FIG. 13, the NT switch 1434 is configured to use an address remapping and RID remapping table 1436 to remap the request from the SSD device 1432. For example, the NT switch 1434 may be configured to map the GPA 1420 in global address space to a corresponding egress port on the NT switch 1434 that routes to the corresponding host or VM 1404. The NT switch 1434 further shifts the GPA 1420 in global address space to a GPA 1408 in the local address range of that host or VM 1404. The NT switch also remaps the RID of the request from the SSD RID to the LNV RID. If the target destination is a physical host, the RID may be remapped to the corresponding LNV PF RID. If the target destination is a VM 1404, the RID may be remapped to the corresponding LNV VF RID. The remapped request may be executed according to the I/O control flow described herein. In this manner, the SSD devices 1432 may be enabled to access VF data buffers without requiring the LNV device 1412 to perform GPA to HPA translation. Further, the SSD devices 1432 are hidden from the view of the VMs 1404.

Figure 15:
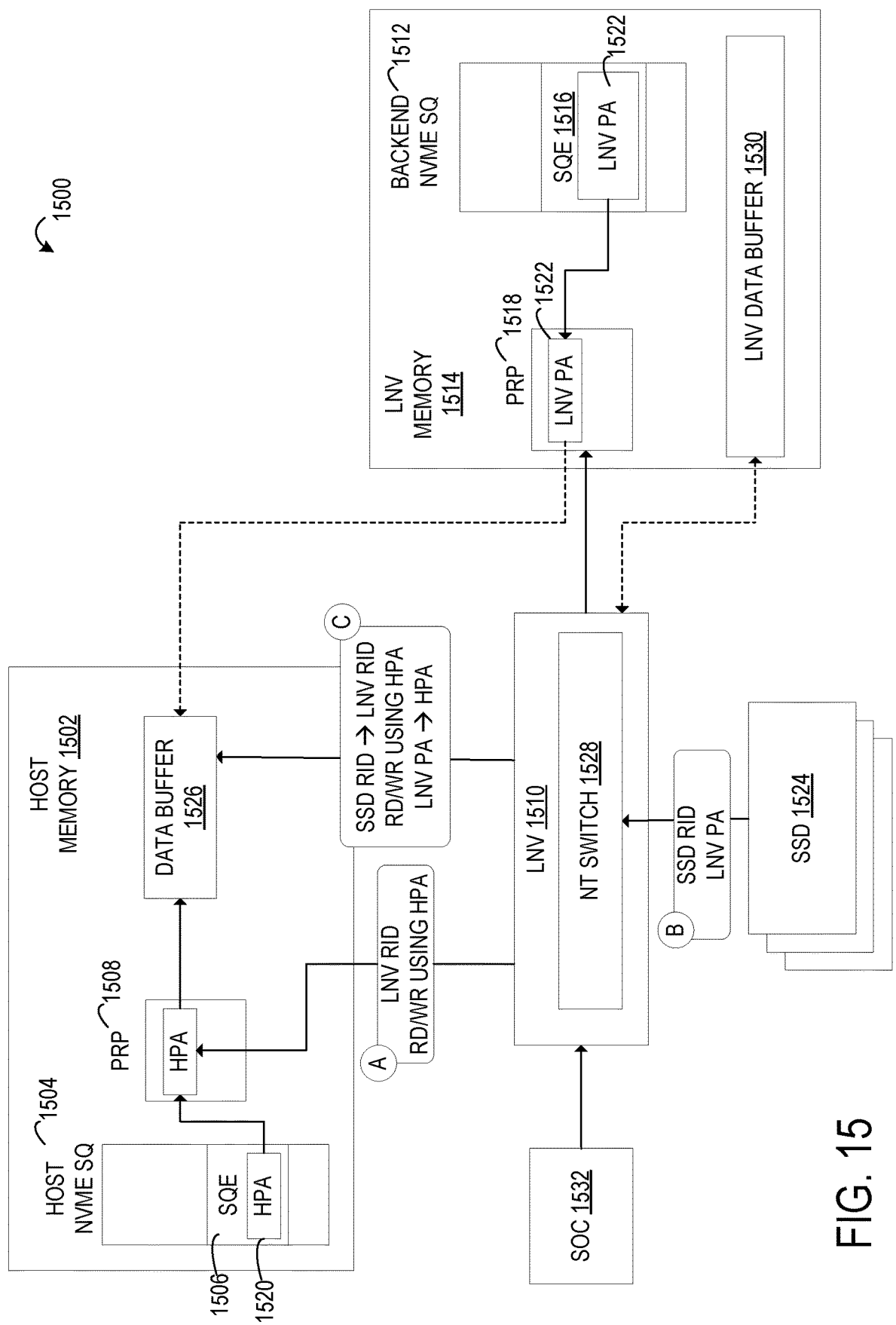
FIG. 15 shows an example system architecture where the local non-volatile memory express virtualization device accesses client data buffers on behalf of the solid-state drive devices for the server system of FIG. 1.

FIG. 15 illustrates an example system architecture 1500 where the LNV device accesses client data buffers on behalf of the SSD devices. As illustrated, the NVMe stack of the host, such as host software on a bare-metal platform or a VM for a virtual environment, generates NVMe commands that are placed into a host NVMe SQ 1504 as SQE 1506 and PRPs 1508. Both the SQE 1506 and PRP 1508 use HPAs 1520 of the host memory 1502 in a bare-metal platform example. However, it should be appreciated that in a virtual platform, the SQE 1506 and PRP 1508 may use GPAs using the techniques described herein.

The LNV device 1510 initiates a PCIe transaction at (A) to read the SQE 1506 from the next location in the host NVMe SQ 1504 in host memory 1502. The LNV device 1510 builds and writes backend NVMe commands that are placed into the backend NVMe SQ 1512 of LNV memory 1514 as SQE 1516. The LNV device 1510 also writes PRPs 1518 to the LNV memory 1514. The LNV device 1510 translates the HPAs 1520 of host memory 1502 to local address space of the LNV device 1510, shown as LNV PA 1522.

In contrast to the architectures of FIGS. 7, 8, and 14, the SSD devices 1524 are not configured to directly access the data buffers 1526 of host memory 1502. Rather, the SSD devices 1524 are configured to initiate a PCIe transaction, at (B), to the LNV device 1510. The LNV device 1510 may include a logical NT switch 1528 that may perform the functions and techniques of the NT switch described herein. The LNV 1510 is configured to access the data buffers 1526 of host memory 1502 on behalf of the SSD device 1524. For example, to complete a read request, the SSD device 1524 may be configured to process the SQE 1516 in backend NVMe SQ 1512 and PRP 1518 in LNV memory 1514, and may then write to an LNV data buffer 1530 indicated in the PRP 1518. The LNV device 1510 may then initiate a PCIe transaction at (C) to access the data buffer 1526 of host memory 1502 using the LNV RID, and translate from LNV PA 1522 to HPA 1520 of host memory 1502 to write the data in the LNV data buffer 1530 of LNV memory 1514 to the data buffer 1526 of host memory 1502. In this manner, data from the SSD 1524 may be sent to the host memory 1502 on behalf of the SSD device 1524 such that the SSD device remains hidden from the host.

For a write request, the LNV device 1502 may translate from HPAs 1520 to LNV PA 1522, and write the data from the data buffer 1526 to the LNV data buffer 1530 based on the translated addresses. The SSD device 1524 may then process the SQE 1516 and PRP 1518 and use the LNV PA 1522 to retrieve the data from the LNV data buffer 1530, and write the data to the SSD device 1524. In this manner, both read and write requests for the SSD device 1524 may be handled by the LNV device 1510 such that the SSD device 1524 does not send PCIe transactions to the host.

In one example, as the data for the read and write requests are handled by the LNV device 1510 before being sent to the SSD device 1524, the LNV device 1510 may perform processing on the data before it is passed to the SSD device 1524. For example, the LNV device 1510 may be configured to use a client key of the host to encrypt/decrypt data that is passed through the LNV device 1510. As the SSD devices 1524 may be virtualized and shared among multiple hosts or VMs, the data from each host or VM may be separately encrypted before being stored on the SSD devices. It should be appreciated that in this model, the LNV device 1510 performs the encryption, and both the host/VM and SSD devices 1524 may be unaware that the encryption is occurring.

Figure 16:
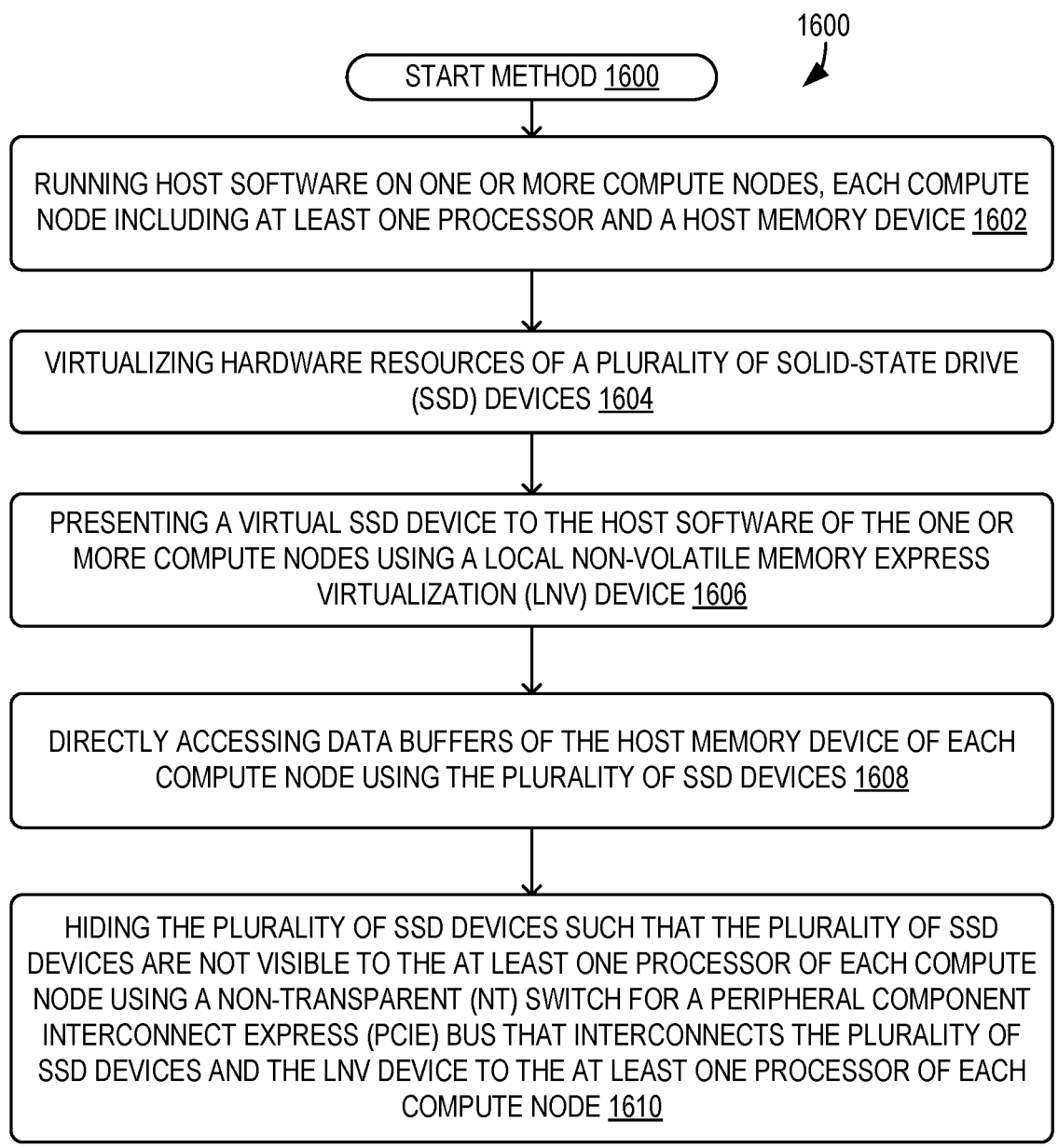
FIG. 16 shows a flow chart for a computer-implemented method for performing SSD device virtualization that may be implemented by the server system of FIG. 1.

FIG. 16 shows a flowchart for a computer-implemented method 1600. The method 1600 may be implemented by the server system of FIG. 1 to perform SSD device virtualization, or by other suitable hardware. At 1602, the method 1600 may include running host software on one or more compute nodes, each compute node including at least one processor and a host memory device. The compute nodes may be part of a datacenter, such as the example datacenter illustrated in FIG. 4. The datacenter may be configured as a bare-metal configuration or a virtualized environment configuration.

At 1604, the method 1600 may include virtualizing hardware resources of a plurality of solid-state drive (SSD) devices. An input/output control flow for virtualizing hardware resources of the SSD devices is described above with reference to FIG. 3.

At 1606, the method 1600 may include presenting a virtual SSD device to the host software of the one or more compute nodes using a local non-volatile memory express virtualization (LNV) device. The virtual SSD device is perceived by the host software as a standard NVMe device, as shown in FIG. 3. Thus, the host software may interact with the virtual SSD device using a standard NVMe stack and standard protocols.

At 1608, the method 1600 may include directly accessing data buffers of the host memory device of each compute node using the plurality of SSD devices. The SSD device itself may initiate a PCIe transaction to access the data buffers in the host memory, as shown in FIG. 7. By accessing the data buffers directly, input/output flow to the SSD device is not limited by the uplink of the LNV device.

At 1610, the method 1600 may include hiding the plurality of SSD devices such that the plurality of SSD devices are not visible to the at least one processor of each compute node using a non-transparent (NT) switch for a peripheral component interconnect express (PCIe) bus that interconnects the plurality of SSD devices and the LNV device to the at least one processor of each compute node. For example, the SSD devices are placed into a different PCIe domain than the hosts. Thus, the SSD devices will not be enumerated or shown to the host devices. From the perspective of the hosts, the SSD devices are not visible. The NT switch may perform different functions to hide the SSD devices, such as RID remapping.

Figure 17:
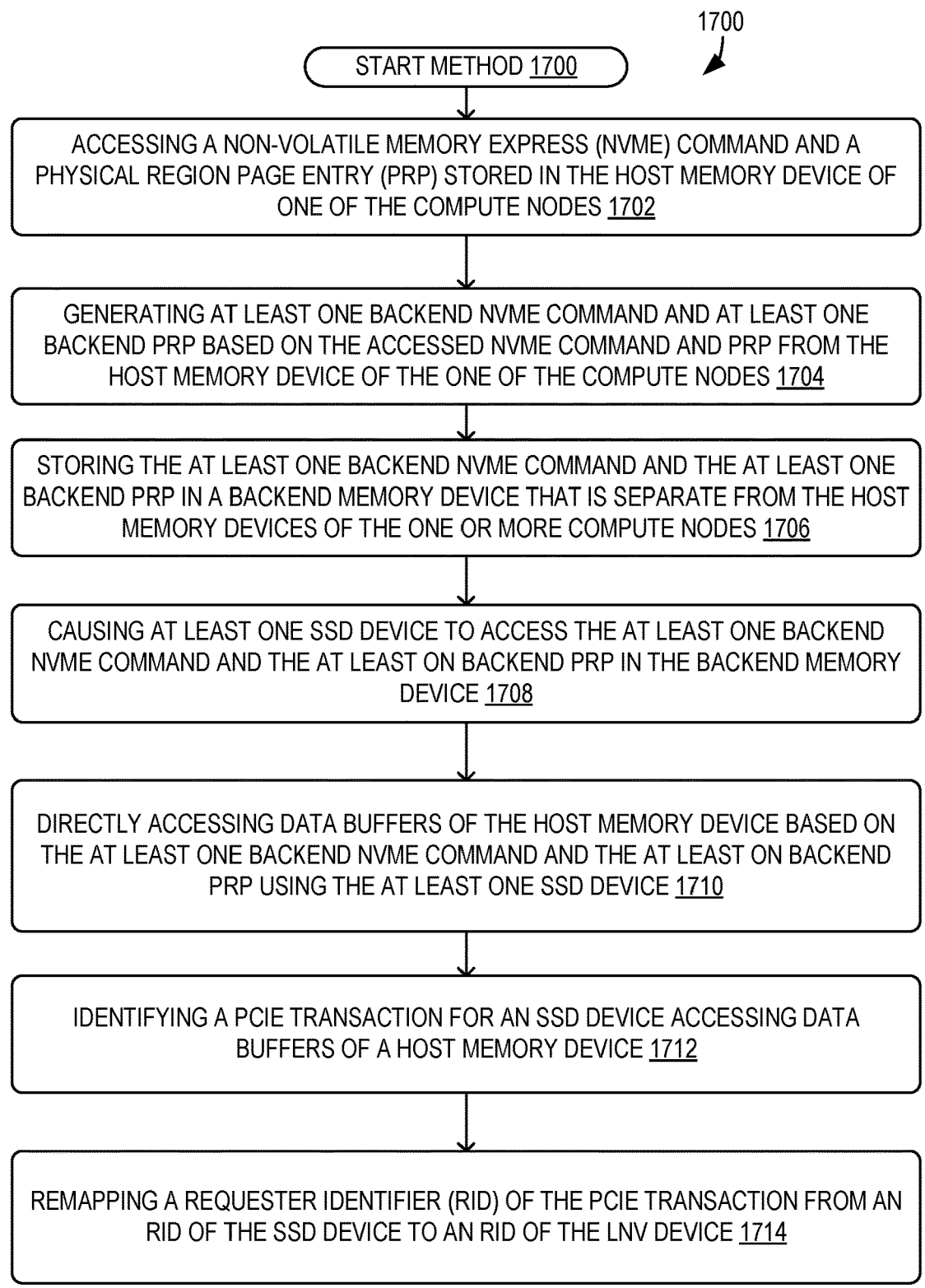
FIG. 17 shows a flowchart for a computer-implemented method for performing SSD device virtualization and hiding the SSD devices from a host that is optimized for bare-metal environment configurations of the server system of FIG. 1.

FIG. 17 shows a flowchart for a computer-implemented method 1700 for performing SSD device virtualization and hiding the SSD devices from a host that is optimized for bare-metal environments. At 1702, the method 1700 may include accessing a non-volatile memory express (NVMe) command and a physical region page entry (PRP) stored in the host memory device of one of the compute nodes. The NVMe command may be stored in an SQ in host memory, as shown in FIG. 7. The LNV device may retrieve the NVMe command via a PCIe transaction with the host.

At 1704, the method 1700 may include generating at least one backend NVMe command and at least one backend PRP based on the accessed NVMe command and PRP from the host memory device of the one of the compute nodes. The LNV may potentially generate more than one backend NVMe command and backend PRP for each accessed NVMe command and PRP that was accessed from the host memory device. For example, the LNV device may be configured to write data to multiple different SSD devices, and would thus generate multiple backend NVMe commands for each of those devices. In this manner, the LNV device may virtualize the hardware resources of the SSD devices.

At 1706, the method 1700 may include storing the at least one backend NVMe command and the at least one backend PRP in a backend memory device that is separate from the host memory devices of the one or more compute nodes. The backend memory device is separate from the host memory device of the compute nodes, and is thus not visible or accessible to the hosts.

At 1708, the method 1700 may include causing at least one SSD device to access the at least one backend NVMe command and the at least on backend PRP in the backend memory device. The LNV device may ring the doorbell of the target SSD device to cause that SSD device to access the backend SQ in backend memory.

At 1710, the method 1700 may include directly accessing data buffers of the host memory device based on the at least one backend NVMe command and the at least on backend PRP using the at least one SSD device. The SSD devices may then access the data buffer in host memory indicated by the backend PRP, as described above with reference to FIG. 7.

At 1712, the method 1700 may include identifying a PCIe transaction for an SSD device accessing data buffers of a host memory device. The NT switch may be configured to identify the PCIe transaction.

At 1714, the method 1700 may include remapping a requester identifier (RID) of the PCIe transaction from an RID of the SSD device to an RID of the LNV device. RID remapping may be performed by the NT switch using RID remapping tables described above with reference to FIG. 11.

Figure 18:
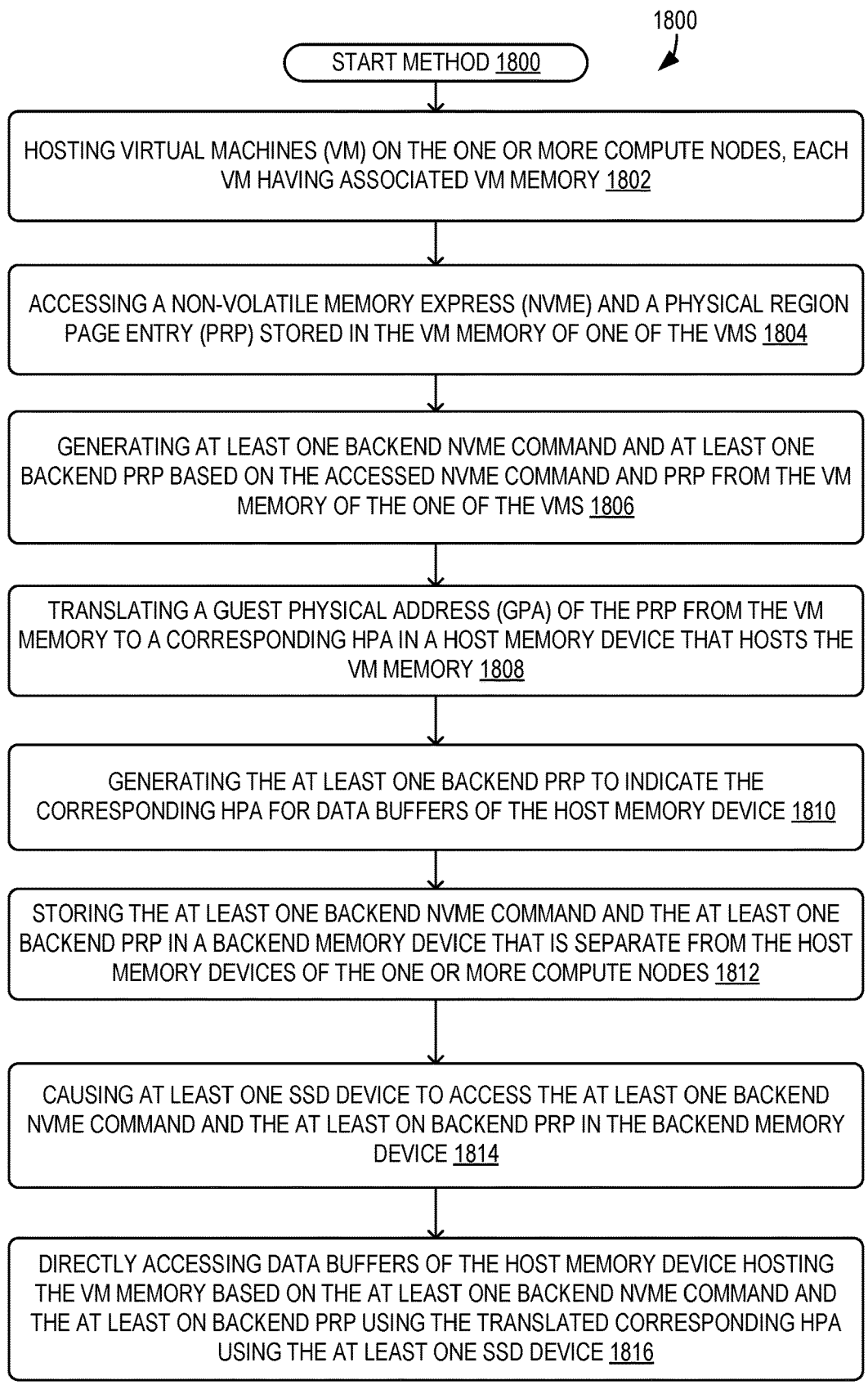
FIG. 18 shows a flowchart for a computer-implemented method for performing SSD device virtualization and hiding the SSD devices from a host that is optimized for virtualized environment configurations of the server system of FIG. 1.

FIG. 18 shows a flowchart for a computer-implemented method 1800 for performing SSD device virtualization and hiding the SSD devices from a host that is optimized for virtualized environments. At 1802, the method 1800 may include hosting virtual machines (VM) on the one or more compute nodes, each VM having associated VM memory.

At 1804, the method 1800 may include accessing a non-volatile memory express (NVMe) and a physical region page entry (PRP) stored in the VM memory of one of the VMs. An example virtual machine and associated virtual machine memory are shown in FIG. 8. An example virtualized environment configuration of a datacenter is described above with reference to FIG. 4.

At 1806, the method 1800 may include generating at least one backend NVMe command and at least one backend PRP based on the accessed NVMe command and PRP from the VM memory of the one of the VMs. VM memory may be run using the hardware resources of the physical host memory device.

At 1808, the method 1800 may include translating a guest physical address (GPA) of the PRP from the VM memory to a corresponding HPA in a host memory device that hosts the VM memory. The LNV device may be configured to send an address translation services request to an IOMMU to perform the translation from GPAs to HPAs, as described above with reference to FIG. 8.

At 1810, the method 1800 may include generating the at least one backend PRP to indicate the corresponding HPA for data buffers of the host memory device. The backend PRP may be populated with the corresponding HPA and stored in backend memory.

At 1812, the method 1800 may include storing the at least one backend NVMe command and the at least one backend PRP in a backend memory device that is separate from the host memory devices of the one or more compute nodes. The backend memory is separate from the host memory, as described above with reference to FIG. 8.

At 1814, the method 1800 may include causing at least one SSD device to access the at least one backend NVMe command and the at least on backend PRP in the backend memory device. The LNV may ring the doorbell of the target SSD device to cause the SSD device to access the backend SQ in backend memory.

At 1816, the method 1800 may include directly accessing data buffers of the host memory device hosting the VM memory based on the at least one backend NVMe command and the at least on backend PRP using the translated corresponding HPA using the at least one SSD device. The accessed PRP indicates an HPA of the host memory device. Thus, the SSD device may directly access the data buffers of the host memory device using the indicated HPAs.

Figure 19:
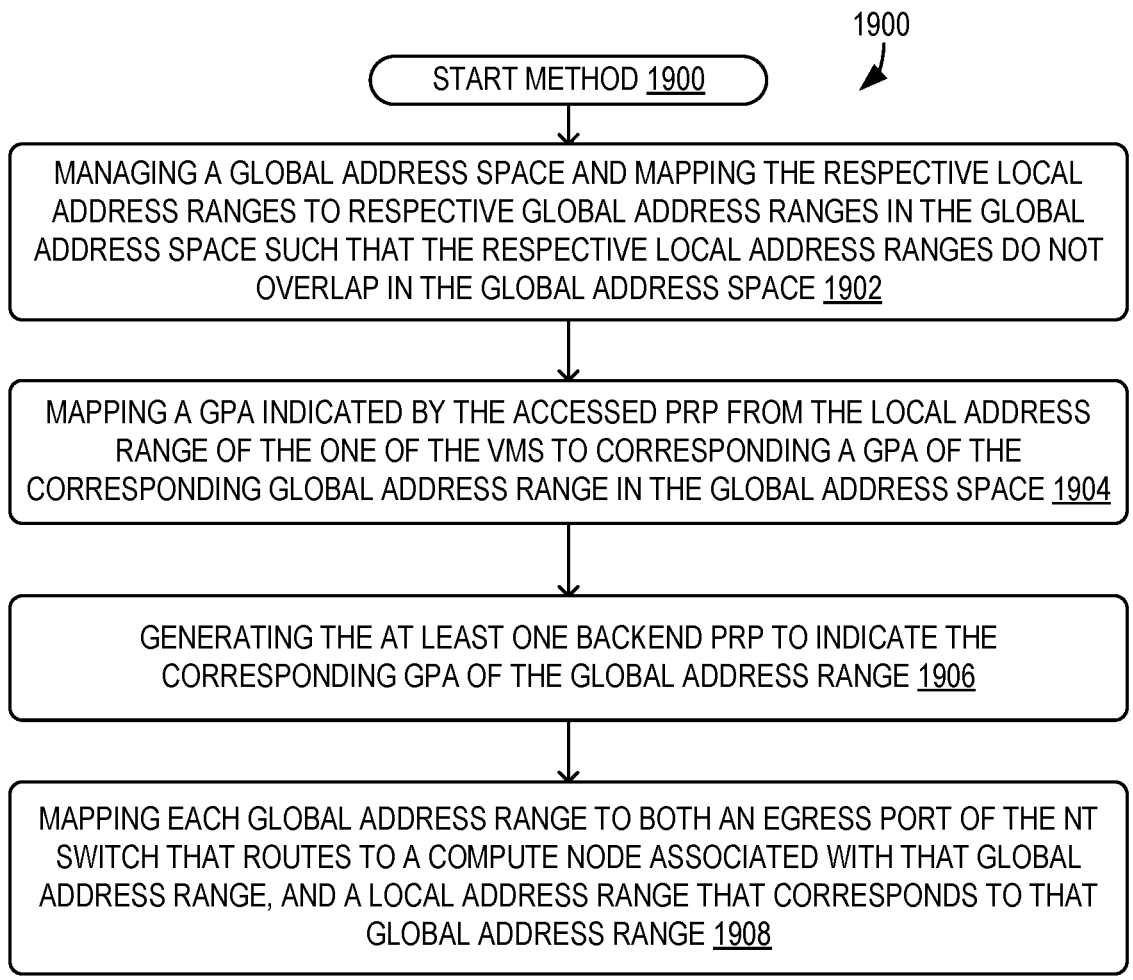
FIG. 19 shows a flowchart for a computer-implemented method for mapping local address ranges to a global address range in a global address space that is optimized for a virtualized environment configuration of the server system of FIG. 1.

FIG. 19 shows a flowchart for a computer-implemented method 1900 for mapping local address ranges to a global address range in a global address space that is optimized for a virtualized environment configuration. At 1902, the method 1900 may include managing a global address space and mapping the respective local address ranges to respective global address ranges in the global address space such that the respective local address ranges do not overlap in the global address space. An example global address space that includes stacked local address ranges is described above with reference to FIG. 13.

At 1904, the method 1900 may include mapping a GPA indicated by the accessed PRP from the local address range of the one of the VMs to corresponding a GPA of the corresponding global address range in the global address space. The global address space may be managed by the LNV device, which is configured to map the accessed PRPs from the local address range of a particular host to the corresponding global address range in global address space.

At 1906, the method 1900 may include generating the at least one backend PRP to indicate the corresponding GPA of the global address range. The backend PRP may be populated with the corresponding GPA of the global address.

At 1908, the method 1900 may include mapping each global address range to both an egress port of the NT switch that routes to a compute node associated with that global address range, and a local address range that corresponds to that global address range. Based on the global address range, the NT switch may have a mapping table that maps that global address range to the associated host, and the route to that host including the egress port on the NT switch, as described above with reference to FIG. 13.

The systems and methods described above may be used to virtualize the hardware resources of NVMe SSD devices to be shared among different hosts. Virtualization of basic local NVMe devices using the techniques described herein enables quality of service, security and performance isolation, flexible resource allocation and management, serviceability, thin provisioning, without requiring any special capabilities from basic NVMe SSDs, and allowing to use cost efficient commodity SSDs.

In some embodiments, the methods and processes described herein may be tied to a computing system of one or more computing devices. In particular, such methods and processes may be implemented as a computer-application program or service, an application-programming interface (API), a library, and/or other computer-program product.

Figure 20:
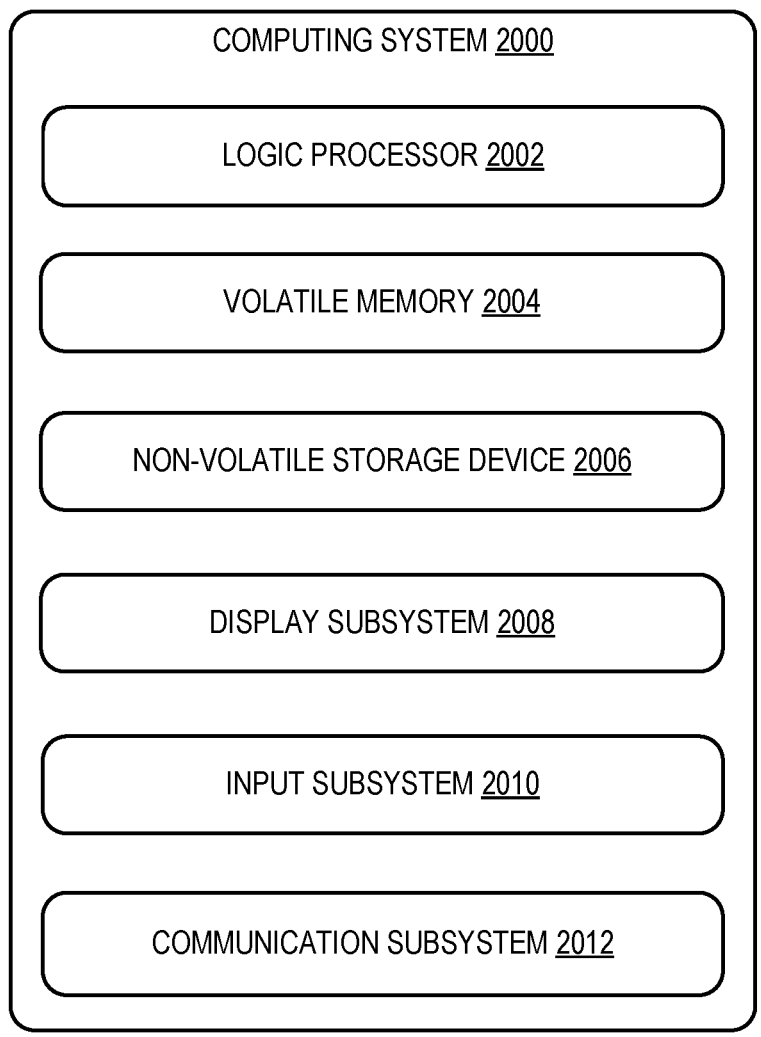
FIG. 20 shows a schematic view of an example computing environment in which the server system of FIG. 1 may be enacted.

FIG. 20 schematically shows a non-limiting embodiment of a computing system 2000 that can enact one or more of the methods and processes described above. Computing system 2000 is shown in simplified form. Computing system 2000 may embody the server system 100 described above and illustrated in FIG. 1. Computing system 2000 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 2000 includes a logic processor 2002 volatile memory 2004, and a non-volatile storage device 2006. Computing system 2000 may optionally include a display subsystem 2008, input subsystem 2010, communication subsystem 2012, and/or other components not shown in FIG. 20.

Logic processor 2002 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 2002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 2006 includes one or more physical devices configured to hold instructions executable by the logic processors to implement the methods and processes described herein. When such methods and processes are implemented, the state of non-volatile storage device 2006 may be transformed—e.g., to hold different data.

Non-volatile storage device 2006 may include physical devices that are removable and/or built in. Non-volatile storage device 2006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 2006 may include nonvolatile, dynamic, static, read/write, read-only, sequential-access, location-addressable, file-addressable, and/or content-addressable devices. It will be appreciated that non-volatile storage device 2006 is configured to hold instructions even when power is cut to the non-volatile storage device 2006.

Volatile memory 2004 may include physical devices that include random access memory. Volatile memory 2004 is typically utilized by logic processor 2002 to temporarily store information during processing of software instructions.

It will be appreciated that volatile memory 2004 typically does not continue to store instructions when power is cut to the volatile memory 2004.

Aspects of logic processor 2002, volatile memory 2004, and non-volatile storage device 2006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 2000 typically implemented in software by a processor to perform a particular function using portions of volatile memory, which function involves transformative processing that specially configures the processor to perform the function. Thus, a module, program, or engine may be instantiated via logic processor 2002 executing instructions held by non-volatile storage device 2006, using portions of volatile memory 2004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 2008 may be used to present a visual representation of data held by non-volatile storage device 2006. The visual representation may take the form of a graphical user interface (GUI). As the herein described methods and processes change the data held by the non-volatile storage device, and thus transform the state of the non-volatile storage device, the state of display subsystem 2008 may likewise be transformed to visually represent changes in the underlying data. Display subsystem 2008 may include one or more display devices utilizing virtually any type of technology. Such display devices may be combined with logic processor 2002, volatile memory 2004, and/or non-volatile storage device 2006 in a shared enclosure, or such display devices may be peripheral display devices.

When included, input subsystem 2010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 2012 may be configured to communicatively couple various computing devices described herein with each other, and with other devices. Communication subsystem 2012 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 2000 to send and/or receive messages to and/or from other devices via a network such as the Internet.

The following paragraphs provide additional support for the claims of the subject application. One aspect provides a server system comprising one or more compute nodes configured to run host software. Each compute node includes at least one processor and a host memory device. The server system further comprises a plurality of solid-state drive (SSD) devices, a local non-volatile memory express virtualization (LNV) device, and a non-transparent (NT) switch for a peripheral component interconnect express (PCIe) bus that interconnects the plurality of SSD devices and the LNV device to the at least one processor of each compute node. The LNV device is configured to virtualize hardware resources of the plurality of SSD devices and present a virtual SSD device to the host software of the one or more compute nodes. The plurality of SSD devices are configured to directly access data buffers of the host memory device. The NT switch is configured to hide the plurality of SSD devices such that the plurality of SSD devices are not visible to the at least one processor of each compute node. In this aspect, additionally or alternatively, the LNV device may be configured to access a non-volatile memory express (NVMe) command and a physical region page entry (PRP) stored in the host memory device of one of the compute nodes, generate at least one backend NVMe command and at least one backend PRP based on the accessed NVMe command and PRP from the host memory device of the one of the compute nodes, and store the at least one backend NVMe command and the at least one backend PRP in a backend memory device that is separate from the host memory devices of the one or more compute nodes. In this aspect, additionally or alternatively, the LNV device may be configured to cause at least one SSD device to access the at least one backend NVMe command and the at least on backend PRP in the backend memory device, and the at least one SSD device may be configured to directly access data buffers of the host memory device based on the at least one backend NVMe command and the at least on backend PRP. In this aspect, additionally or alternatively, the NT switch may be configured to identify a PCIe transaction for an SSD device accessing data buffers of a host memory device, and remap a requester identifier (RID) of the PCIe transaction from an RID of the SSD device to an RID of the LNV device. In this aspect, additionally or alternatively, the one or more compute nodes may be configured to host virtual machines (VM), each VM having associated VM memory. The LNV device may be configured to access a non-volatile memory express (NVMe) and a physical region page entry (PRP) stored in the VM memory of one of the VMs, generate at least one backend NVMe command and at least one backend PRP based on the accessed NVMe command and PRP from the VM memory of the one of the VMs, and store the at least one backend NVMe command and the at least one backend PRP in a backend memory device that is separate from the host memory devices of the one or more compute nodes. In this aspect, additionally or alternatively, the LNV device may be configured to translate a guest physical address (GPA) of the PRP from the VM memory to a corresponding HPA in a host memory device that hosts the VM memory, and generate the at least one backend PRP to indicate the corresponding HPA for data buffers of the host memory device. In this aspect, additionally or alternatively, the LNV device may be configured to cause at least one SSD device to access the at least one backend NVMe command and the at least on backend PRP in the backend memory device, and the at least one SSD device may be configured to directly access data buffers of the host memory device hosting the VM memory based on the at least one backend NVMe command and the at least on backend PRP using the translated corresponding HPA. In this aspect, additionally or alternatively, the host software of each compute node and each VM may have respective local address ranges. The LNV device may be configured to manage a global address space and map the respective local address ranges to respective global address ranges in the global address space such that the respective local address ranges do not overlap in the global address space. The LNV device may be configured to map a GPA indicated by the accessed PRP from the local address range of the one of the VMs to corresponding a GPA of the corresponding global address range in the global address space, and generate the at least one backend PRP to indicate the corresponding GPA of the global address range. In this aspect, additionally or alternatively, the NT switch may be configured to map each global address range to both an egress port of the NT switch that routes to a compute node associated with that global address range, and a local address range that corresponds to that global address range.

Another aspect provides a method comprising running host software on one or more compute nodes. Each compute node include sat least one processor and a host memory device. The method further comprises virtualizing hardware resources of a plurality of solid-state drive (SSD) devices, presenting a virtual SSD device to the host software of the one or more compute nodes using a local non-volatile memory express virtualization (LNV) device, directly accessing data buffers of the host memory device of each compute node using the plurality of SSD devices, and hiding the plurality of SSD devices such that the plurality of SSD devices are not visible to the at least one processor of each compute node using a non-transparent (NT) switch for a peripheral component interconnect express (PCIe) bus that interconnects the plurality of SSD devices and the LNV device to the at least one processor of each compute node. In this aspect, additionally or alternatively, the method may further comprise accessing a non-volatile memory express (NVMe) command and a physical region page entry (PRP) stored in the host memory device of one of the compute nodes, generating at least one backend NVMe command and at least one backend PRP based on the accessed NVMe command and PRP from the host memory device of the one of the compute nodes, and storing the at least one backend NVMe command and the at least one backend PRP in a backend memory device that is separate from the host memory devices of the one or more compute nodes. In this aspect, additionally or alternatively, the method may further comprise causing at least one SSD device to access the at least one backend NVMe command and the at least on backend PRP in the backend memory device, and directly accessing data buffers of the host memory device based on the at least one backend NVMe command and the at least on backend PRP using the at least one SSD device. In this aspect, additionally or alternatively, the method may further comprise identifying a PCIe transaction for an SSD device accessing data buffers of a host memory device, and remapping a requester identifier (RID) of the PCIe transaction from an RID of the SSD device to an RID of the LNV device. In this aspect, additionally or alternatively, the method may further comprise hosting virtual machines (VM) on the one or more compute nodes, each VM having associated VM memory. The method may further comprise accessing a non-volatile memory express (NVMe) and a physical region page entry (PRP) stored in the VM memory of one of the VMs, generating at least one backend NVMe command and at least one backend PRP based on the accessed NVMe command and PRP from the VM memory of the one of the VMs, and storing the at least one backend NVMe command and the at least one backend PRP in a backend memory device that is separate from the host memory devices of the one or more compute nodes. In this aspect, additionally or alternatively, the method may further comprise translating a guest physical address (GPA) of the PRP from the VM memory to a corresponding HPA in a host memory device that hosts the VM memory, and generating the at least one backend PRP to indicate the corresponding HPA for data buffers of the host memory device. In this aspect, additionally or alternatively, the method may further comprise causing at least one SSD device to access the at least one backend NVMe command and the at least on backend PRP in the backend memory device, and directly accessing data buffers of the host memory device hosting the VM memory based on the at least one backend NVMe command and the at least on backend PRP using the translated corresponding HPA using the at least one SSD device. In this aspect, additionally or alternatively, the host software of each compute node and each VM may have respective local address ranges, and the method may further comprise managing a global address space and mapping the respective local address ranges to respective global address ranges in the global address space such that the respective local address ranges do not overlap in the global address space, mapping a GPA indicated by the accessed PRP from the local address range of the one of the VMs to corresponding a GPA of the corresponding global address range in the global address space, and generating the at least one backend PRP to indicate the corresponding GPA of the global address range. In this aspect, additionally or alternatively, the method may further comprise mapping each global address range to both an egress port of the NT switch that routes to a compute node associated with that global address range, and a local address range that corresponds to that global address range.

Another aspect provides a server system comprising one or more compute nodes configured to run host software. Each compute node includes at least one processor and a host memory device. The server system further comprises a plurality of solid-state drive (SSD) devices, and a local non-volatile memory express virtualization (LNV) device that includes a logical non-transparent (NT) switch that interconnects the LNV device to the plurality of SSD devices and the at least one processor of each compute node. The LNV device is configured to virtualize hardware resources of the plurality of SSD devices and present a virtual SSD device to the host software of the one or more compute nodes. The LNV device is configured to access data buffers of the host memory device of each compute node on behalf of the plurality of SSD devices. The logical NT switch is configured to hide the plurality of SSD devices such that the plurality of SSD devices are not visible to the at least one processor of each compute node. In this aspect, additionally or alternatively, the LNV device may be configured to encrypt data accessed from data buffers of the host memory device of each compute node.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A server system comprising:
a compute node configured to run host software, the compute node including a processor and a host memory device;
a plurality of solid-state drive (SSD) devices;
a local non-volatile memory express virtualization (LNV) device; and
a non-transparent (NT) switch for a peripheral component interconnect express (PCIe) bus that interconnects the plurality of SSD devices and the LNV device to the processor of the compute node, wherein
the LNV device is configured to virtualize hardware resources of the plurality of SSD devices and present a virtual SSD device to the host software of the compute node,
the plurality of SSD devices are configured to bypass the LNV device to access data buffers of the host memory device through the NT switch, and
the NT switch is configured to hide the plurality of SSD devices such that the plurality of SSD devices are not visible to the processor of the compute node.

2. The server system of claim 1, wherein the LNV device is configured to:
access a non-volatile memory express (NVMe) command and a physical region page entry (PRP) stored in the host memory device of the compute node;
generate a backend NVMe command and a backend PRP based on the accessed NVMe command and PRP from the host memory device of the compute node; and
store the backend NVMe command and the backend PRP in a backend memory device that is separate from the host memory device of the compute node.

3. The server system of claim 2, wherein
the LNV device is configured to cause a target SSD device of the plurality of SSD devices to access the backend NVMe command and the backend PRP in the backend memory device; and
the target SSD device is configured to bypass the LNV device to access data buffers of the host memory device through the NT switch based on the backend NVMe command and the backend PRP.

4. The server system of claim 3, wherein the NT switch is configured to:
identify a PCIe transaction for the target SSD device accessing data buffers of the host memory device; and
remap a requester identifier (RID) of the PCIe transaction from an RID of the target SSD device to an RID of the LNV device.

5. The server system of claim 1, wherein the compute node is configured to host virtual machines (VM), each VM having associated VM memory; and
wherein the LNV device is configured to:
access a non-volatile memory express (NVMe) and a physical region page entry (PRP) stored in the VM memory of one of the VMs;
generate a backend NVMe command and a backend PRP based on the accessed NVMe command and PRP from the VM memory of the one of the VMs; and
store the backend NVMe command and the backend PRP in a backend memory device that is separate from the host memory device of the compute node.

6. The server system of claim 5, wherein the LNV device is configured to:
translate a guest physical address (GPA) of the PRP from the VM memory to a corresponding host physical address (HPA) in the host memory device that hosts the VM memory; and
generate the backend PRP to indicate the corresponding HPA for data buffers of the host memory device.

7. The server system of claim 6, wherein
the LNV device is configured to cause the target SSD device to access the backend NVMe command and the backend PRP in the backend memory device, and
the target SSD device is configured to bypass the LNV device to access data buffers of the host memory device hosting the VM memory through the NT switch based on the backend NVMe command and the backend PRP using the translated corresponding HPA.

8. The server system of claim 5, wherein
the host software of the compute node and each VM have respective local address ranges,
the LNV device is configured to manage a global address space and map the respective local address ranges to respective global address ranges in the global address space such that the respective local address ranges do not overlap in the global address space, and
the LNV device is configured to map a GPA indicated by the accessed PRP from the local address range of the one of the VMs to a corresponding GPA of the corresponding global address range in the global address space, and generate the at least one backend PRP to indicate the corresponding GPA of the global address range.

9. The server system of claim 8, wherein the NT switch is configured to map each global address range to both an egress port of the NT switch that routes to a compute node associated with that global address range, and a local address range that corresponds to that global address range.

10. A method comprising:
running host software on a compute node, the compute node including a processor and a host memory device;
virtualizing hardware resources of a plurality of solid-state drive (SSD) devices;
presenting a virtual SSD device to the host software of the compute node using a local non-volatile memory express virtualization (LNV) device;
bypassing the LNV device to access data buffers of the host memory device of the compute node through a non-transparent (NT) switch using the plurality of SSD devices; and
hiding the plurality of SSD devices such that the plurality of SSD devices are not visible to the processor of the compute node using the NT switch for a peripheral component interconnect express (PCIe) bus that interconnects the plurality of SSD devices and the LNV device to the processor of the compute node.

11. The method of claim 10, further comprising:
accessing a non-volatile memory express (NVMe) command and a physical region page entry (PRP) stored in the host memory device of the compute node;
generating a backend NVMe command and a backend PRP based on the accessed NVMe command and PRP from the host memory device of the compute node; and
storing the backend NVMe command and the backend PRP in a backend memory device that is separate from the host memory device of the compute node.

12. The method of claim 11, further comprising:
causing a target SSD device to access the backend NVMe command and the backend PRP in the backend memory device; and
bypassing the LNV device to access data buffers of the host memory device through the NT switch based on the backend NVMe command and the backend PRP using the target SSD device.

13. The method of claim 12, further comprising:
identifying a PCIe transaction for the target SSD device accessing data buffers of the host memory device; and
remapping a requester identifier (RID) of the PCIe transaction from an RID of the target SSD device to an RID of the LNV device.

14. The method of claim 10, further comprising:
hosting virtual machines (VM) on the compute node, each VM having associated VM memory;
accessing a non-volatile memory express (NVMe) and a physical region page entry (PRP) stored in the VM memory of one of the VMs;
generating a backend NVMe command and a backend PRP based on the accessed NVMe command and PRP from the VM memory of the one of the VMs; and
storing the backend NVMe command and the backend PRP in a backend memory device that is separate from the host memory device of the compute node.

15. The method of claim 14, further comprising:
translating a guest physical address (GPA) of the PRP from the VM memory to a corresponding host physical address (HPA) in the host memory device that hosts the VM memory; and
generating the backend PRP to indicate the corresponding HPA for data buffers of the host memory device.

16. The method of claim 15, further comprising:
causing a target SSD device of the plurality of SSD devices to access the backend NVMe command and the backend PRP in the backend memory device; and
bypassing the LNV device to access data buffers of the host memory device hosting the VM memory through the NT switch based on the backend NVMe command and the backend PRP using the translated corresponding HPA using the target SSD device.

17. The method of claim 14, wherein the host software of the compute node and each VM have respective local address ranges, and the method further comprises:
managing a global address space and mapping the respective local address ranges to respective global address ranges in the global address space such that the respective local address ranges do not overlap in the global address space;
mapping a GPA indicated by the accessed PRP from the local address range of the one of the VMs to a corresponding GPA of the corresponding global address range in the global address space; and
generating the backend PRP to indicate the corresponding GPA of the global address range.

18. The method of claim 17, further comprising mapping each global address range to both an egress port of the NT switch that routes to a compute node associated with that global address range, and a local address range that corresponds to that global address range.

19. A server system comprising:
a compute node configured to run host software, the compute node including a processor and a host memory device;
a plurality of solid-state drive (SSD) devices;
a local non-volatile memory express virtualization (LNV) device that includes a logical non-transparent (NT) switch that interconnects the LNV device to the plurality of SSD devices and the processor of the compute node; wherein
the LNV device is configured to virtualize hardware resources of the plurality of SSD devices and present a virtual SSD device to the host software of the compute node; wherein
the LNV device is configured to bypass the LNV device to access data buffers of the host memory device of the compute node through the NT switch on behalf of the plurality of SSD devices; and wherein
the logical NT switch is configured to hide the plurality of SSD devices such that the plurality of SSD devices are not visible to the processor of the compute node.

20. The server system of claim 19, wherein the LNV device is configured to encrypt data accessed from data buffers of the host memory device of the compute node.

* * * * *